(12) United States Patent
Yamagami et al.

(10) Patent No.: US 10,846,603 B2
(45) Date of Patent: Nov. 24, 2020

(54) DECISION TREE GENERATING APPARATUS, DECISION TREE GENERATING METHOD, NON-TRANSITORY COMPUTER-READABLE RECORDING MEDIUM, AND INQUIRY SYSTEM

(71) Applicant: Panasonic Intellectual Property Management Co., Ltd., Osaka (JP)

(72) Inventors: Katsuyoshi Yamagami, Osaka (JP); Mitsuru Endo, Tokyo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 829 days.

(21) Appl. No.: 15/626,183

(22) Filed: Jun. 19, 2017

(65) Prior Publication Data

US 2018/0005126 A1    Jan. 4, 2018

(30) Foreign Application Priority Data

Jul. 4, 2016  (JP) ................................ 2016-132707

(51) Int. Cl.
*G06N 5/04* (2006.01)
*G06N 20/00* (2019.01)
(Continued)

(52) U.S. Cl.
CPC ......... *G06N 5/045* (2013.01); *G06F 16/9027* (2019.01); *G06N 5/003* (2013.01); *G06N 20/00* (2019.01); *G06Q 30/02* (2013.01)

(58) Field of Classification Search
CPC .... G06F 16/9027; G06N 20/00; G06N 5/003; G06N 5/045; G06Q 30/02
See application file for complete search history.

(56) References Cited

U.S. PATENT DOCUMENTS

| 8,744,891 B1 | 6/2014 | Medina |
| 2003/0220793 A1 | 11/2003 | Kosaka et al. |
| 2011/0106731 A1 | 5/2011 | Pearson et al. |

FOREIGN PATENT DOCUMENTS

| JP | 2000-112936 | 4/2000 |
| JP | 2003-255992 | 9/2003 |
| JP | 2007-334589 | 12/2007 |

OTHER PUBLICATIONS

Huang et al., "A Decision Tree Approach to Conducting Dynamic Assessment in a Context-Aware Ubiquitous Learning Environment", Mar. 26, 2008, Fifth IEEE International Conference on Wireless, Mobile, and Ubiquitous Technology in Education , pp. 89-94 (Year: 2008).*

(Continued)

*Primary Examiner* — Kamran Afshar
*Assistant Examiner* — Brent Johnston Hoover
(74) *Attorney, Agent, or Firm* — Greenblum & Bernstein, P.L.C.

(57) ABSTRACT

A decision tree generating apparatus includes an information gain calculator and a decision tree generator. When a classification target data set including a plurality of pieces of classification target data respectively having different attributes with attribute values assigned thereto is segmented into subsets in a form of a decision tree, the information gain calculator calculates an amount of entropy reduction on each attribute, and calculates an information gain, based on the amount of reduction in the entropy and reliability of a user's answer responsive to an inquiry asking about the attribute. The decision tree generator successively determines an attribute having a maximum information gain to be a node of the decision tree by recursively iterating the segmentation of the pre-segmentation data set, and generates the decision tree that is to be used to determine an order of the inquiries.

12 Claims, 15 Drawing Sheets

(51) Int. Cl.
*G06F 16/901* (2019.01)
*G06Q 30/02* (2012.01)
*G06N 5/00* (2006.01)

(56) References Cited

OTHER PUBLICATIONS

Zhao et al., "An Active Learning Approach for Jointly Estimating Worker Performance and Annotation Reliability with Crowdsourced Data", Jan. 16, 2014, pp. 1-18 (Year: 2014).*
Rokach et al., "Top-Down Induction of Decision Trees Classifiers—A Survey", Nov. 2005, IEEE Transactions on Systems, Man, and Cybernetics—Part C: Applications and Reviews, vol. 35, No. 4, pp. 476-487 (Year: 2005).*
The Extended European Search Report from the European Patent Office (EPO) dated Nov. 7, 2017 for the related European Patent Application No. 17176799.9.

* cited by examiner

FIG. 2

| DATA ID | ATTRIBUTES | | | | CATEGORY |
|---|---|---|---|---|---|
| | x1 | x2 | x3 | x4 | |
| 1 | 1 | 1 | 0 | 0 | C1 |
| 2 | 1 | 0 | 1 | 0 | C2 |
| 3 | 1 | 0 | 1 | 1 | C3 |
| 4 | 1 | 0 | 0 | 1 | C4 |
| 5 | 0 | 1 | 1 | 0 | C5 |
| 6 | 0 | 0 | 1 | 0 | C6 |
| 7 | 0 | 0 | 0 | 1 | C7 |
| 8 | 0 | 0 | 0 | 0 | C8 |

FIG. 3

| RELIABILITY OF INQUIRY (ATTRIBUTE) | | | |
|---|---|---|---|
| x1 | x2 | x3 | x4 |
| 60% | 80% | 90% | 70% |

FIG. 10

| NODE ID | CONTENTS OF NODE | YES | NO |
|---|---|---|---|
| 0 | YES_NO (HEADACHE) | 1 | 2 |
| 1 | YES_NO (FEVER) | 3 | 4 |
| 2 | YES_NO (FEVER) | 5 | 6 |
| 3 | DIAG (VVV) | – | – |
| 4 | YES_NO (DIZZINESS) | 7 | 8 |
| 5 | DIAG (WWW) | – | – |
| 6 | DIAG (XXX) | – | – |
| 7 | DIAG (YYY) | – | – |
| 8 | DIAG (ZZZ) | – | – |

FIG. 14

| INQUIRY ORDER | NODE ID | USER'S ANSWER RESULT | RELIABILITY |
|---|---|---|---|
| 1 | 0 | YES | 90% |
| 2 | 1 | NO | 70% |
| 3 | 4 | NO | 60% |
| 4 | 8 | N/A | N/A |
| 5 | | | |
| 6 | | | |
| 7 | | | |
| 8 | | | |

DECISION TREE GENERATING APPARATUS, DECISION TREE GENERATING METHOD, NON-TRANSITORY COMPUTER-READABLE RECORDING MEDIUM, AND INQUIRY SYSTEM

BACKGROUND

1. Technical Field

The present disclosure relates to a decision tree generating apparatus that generates a decision tree that is used to determine an order of inquiries when candidates of classification results from a user's answer to an inquiry made to the user in dialog are narrowed. The present disclosure also relates a decision tree making method, and a non-transitory computer-readable recording medium. The present disclosure also relates to an inquiry system that makes an inquiry using the decision tree generated by the decision tree generating apparatus, and generates the classification results of the user's answers responsive to inquiries.

2. Description of the Related Art

Multiple inquiries are made to a user in dialog, and classification results optimum for the user's answers may be narrowed. In such a case, related art techniques are available to construct a decision tree such that the number of inquiries and the number of errors in narrowing candidates are as small as possible. See Japanese Unexamined Patent Application Publication Nos. 2000-112936, 2007-334589, and 2003-255992.

More specifically, in accordance with a technique disclosed in Japanese Unexamined Patent Application Publication No. 2000-112936, multiple decision trees are generated with an input to each decision tree containing an error, a narrowed result that is estimated to suffer from a minimum amount of error is adopted from multiple results respectively narrowed by the decision trees. Japanese Unexamined Patent Application Publication No. 2007-334589 discloses a technique of generating a decision tree by taking into account an influence that is involved if the narrowing result using the decision tree is in error. Japanese Unexamined Patent Application Publication No. 2003-255992 discloses a technique of generating a decision tree by accounting for the possibility that an input to a decision tree includes an error in speech recognition.

Since in accordance with the related art techniques, however, the generation of the decision tree is not performed by accounting for the possibility that the user's answer to an inquiry is in error, an appropriate order of inquiries is not determined. The related art techniques have still room for improvement.

SUMMARY

In one general aspect, the techniques disclosed here feature a decision tree generating apparatus. The decision tree generating apparatus includes an information gain calculator and a decision tree generator. When a classification target data set including a plurality of pieces of classification target data respectively having mutually different attributes with attribute values assigned thereto is hierarchically segmented into a plurality of subsets in a form of a decision tree, the information gain calculator calculates an amount of reduction in entropy of the pre-segmentation classification target data set caused by segmentation on each attribute of each piece of the classification target data included in a pre-segmentation data set, and calculates an information gain when the pre-segmentation data set is segmented in accordance with the attribute value of each attribute, based on the amount of reduction in the entropy and reliability that is an index representing correctness or incorrectness of a user's answer responsive to an inquiry asking about the attribute. The decision tree generator successively determines an attribute having a maximum information gain to be a node of the decision tree by recursively iterating the segmentation of the pre-segmentation data set in accordance with the attribute value of the attribute having the maximum information gain from among the information gains calculated on the attributes, and generates the decision tree that is to be used to determine an order of inquiries asking about the attributes in order to classify the pieces of classification target data by successively assigning the attribute value of the attribute having the maximum information gain to an edge of the node.

In accordance with the present disclosure, candidates of classification results from user's answers to inquiries made to the user in dialog are narrowed by making the inquiry to the user. Even if the user's answer is in error, a decision tree that is able to reduce the number of inquiries to the user is generated.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 2 illustrates an example of classification target data;

FIG. 3 illustrates an example of reliability of a user's answer calculated by a user's answer reliability calculator in the decision tree generating apparatus of FIG. 1;

FIG. 10 illustrates an example of a data structure of the decision tree when the decision tree of FIG. 9 is stored onto the inquiry order memory in the medical interview system of FIG. 8;

FIG. 14 illustrates an example of history information of a decision tree node stored on a decision tree node history memory in the medical interview system of FIG. 13;

DETAILED DESCRIPTION

Figure 1:
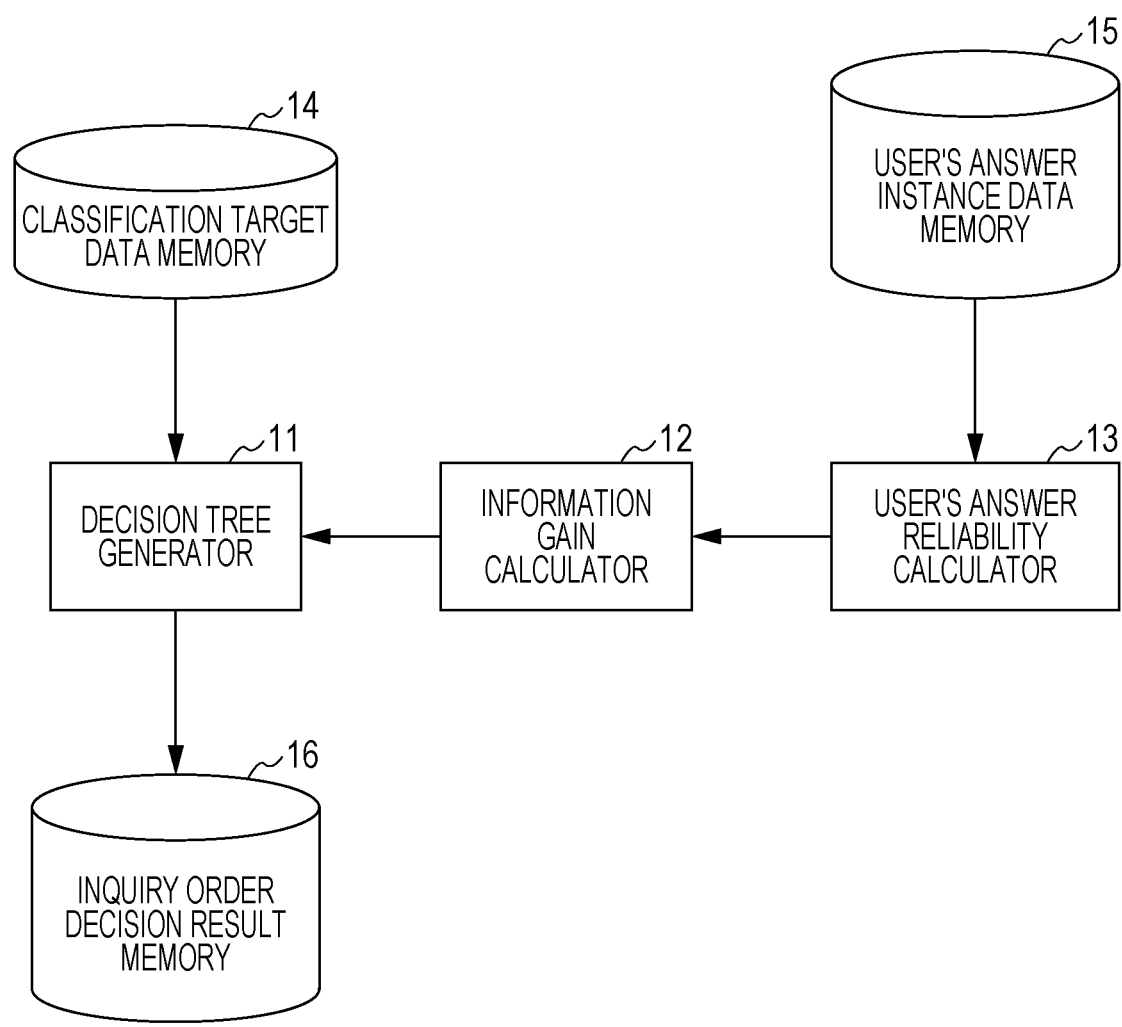
FIG. 1 is a block diagram of a configuration of a decision tree generating apparatus of an embodiment of the disclosure.

Underlying Knowledge Forming Basis of the Present Disclosure

Each of the inquiry order determination methods of the related art is based on the classification of multiple pieces of data using a decision tree. If multiple pieces of classification target data have respective attributes, and the attribute of each piece of classification target data is assigned an attribute value, the decision tree is used to determine the order in which the multiple attributes are to be checked and the order in which the multiple attributes are classified according to the attribute values thereof.

Since an attribute typically has multiple different attribute values, the order of classification according to the attribute forms a tree structure. For this reason, the results that are decided from the order of classification are referred to as a decision tree. By understanding an attribute to be checked as an inquiry, the decision tree may be used to determine the order of inquiries.

An amount of calculation referred to as an information gain is used to determine the order of attribute checks in the decision tree. A classification target data set is segmented into subsets according to the attribute value of an attribute. The information gain is defined as a difference that results from subtracting the sum of entropy values of the subsets subsequent to the segmentation from the entropy of the pre-segmentation classification target data set.

The entropy of the classification target data set is intended to mean information entropy related to a probability distribution indicating what category the classification target data included in the classification target data set is classified in. In view of the property of the information entropy, the information entropy is larger in value as the probability distribution becomes more uniform. The information entropy is smaller in value as the probability distribution is more deviated, in other words, a specific probability event has a higher probability while another probability event has a lower probability.

The entropy of the classification target data set is higher as classification category destinations of data contained in the set are more uniformly dispersed, and is lower as the classification category destinations are more deviated to a specific category. Classifying the classification target data according to the attribute value is based on the premise that the entropy becomes lower as the degree of narrowing the classification target data set to a specific category is higher.

The classification target data is classified in accordance with a smaller number of attribute checks by constructing the decision tree such that a classification operation is performed by placing a higher priority on checking an attribute that results in a maximum information gain. More specifically, the order of inquiries is determined such that the number of inquiries is minimized.

FIG. 2 illustrates a classification target data set containing eight pieces of data. Each piece of the data has four attributes $x1$, $x2$, $x3$, and $x4$ with each attribute having 0 or 1 assigned thereto as an attribute value. The decision tree is generated in accordance with the information gain as illustrated in FIG. 7.

Figure 7:
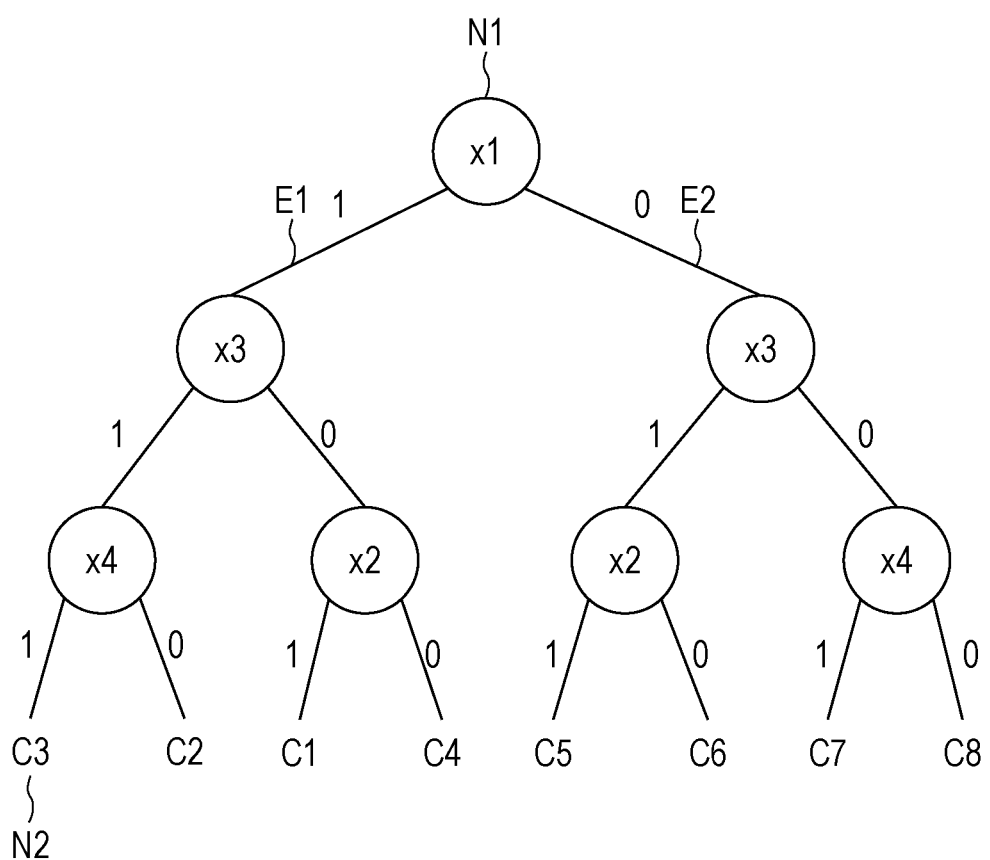
FIG. 7 illustrates an example of the decision tree that is generated by calculating an information gain using only an amount of reduction in entropy rather than using the reliability of the user's answer.

A node N1 represented by a circle of FIG. 7 is referred to as a node of the decision (the same is true of a node represented by a circle having no label). Each node is assigned an attribute to be checked (the node N1 is assigned $x1$, for example). Edges E1 and E2 represented by line segments are referred to edges of the decision tree (the same is true of an edge having a line segment with no label). The edges are arranged in view of the number of types of attribute values that are obtained by checking the attributes of the nodes to which the upper ends of the edges are connected. For example, the edge E1 corresponds to an attribute value of 1 of the attribute $x1$ and the edge E2 corresponds to an attribute value of 0 of the attribute $x1$.

In the decision tree, the attribute N1 (root node) at the highest position is an attribute that is to be checked first. Which edge to be routed is selected, depending on the attribute value obtained as a result of checking. The attribute assigned to the node connected to the bottom end of the selected edge is repeatedly checked in succession.

As illustrated in FIG. 7, a node N2 without any circle is referred to as a leaf node (the same is true of a node having neither label nor circle). The leaf nodes are respectively assigned classified categories C1 through C8. The categories assigned to the leaf nodes correspond to classification results that are reached by repeating the attribute checks from the root node.

The attribute $x1$ is selected as the root node in the decision tree of FIG. 7 because the information gain is maximized if the classification target data is segmented in accordance with the attribute value of the attribute $x1$ out of the four attributes $x1$ through $x4$. In the following discussion, an operation that is recursively iterated in lower nodes is to assign an attribute, having a maximum information gain from among the attributes excluding a previously checked attributes, to a lower node with respect to the classification target data set that is segmented in accordance with the attribute value of a higher node (subset). The generation process of the decision tree is thus performed by repeating the operation until there is no longer any attribute available to be checked or the categories of the classification target data are converged to one type.

The order of attribute checks defined in the decision tree generated in the above process is determined such that the number of attribute checks is minimized with respect to given classification target data. In other words, the order of attribute checks is determined that causes a narrowing process to proceed the fastest. The decision tree is typically used in the classification problem, based on the property of the decision tree that allows the classification to be efficiently performed.

However, the decision method of the inquiry order in related art is unable to generate the decision tree in view of the possibility that a user's answer to an inquiry is in error, and has difficulty in determining an appropriate order of inquiries. The decision method thus has room for improvement.

The technique disclosed in Japanese Unexamined Patent Application Publication No. 2000-112936 excludes, out of the attributes, some that are subject to an attribute check error and uses multiple decision trees that are generated by varying the excluded attributes. The disclosed technique thus reduces the possibility of data classification error under the condition that some attributes are in error. However, there are multiple decision trees, and if the technique is applied to the inquiry order decision in a dialog process, it is difficult to lead to a single inquiry.

In accordance with the technique disclosed in Japanese Unexamined Patent Application Publication No. 2007-334589, considering the degree of effect that a classification error is caused by the decision tree, the decision tree is generated by correcting the information gain. However, the technique is based on the premise that the input of the decision tree is correct, in other words, the technique does not account for an erroneous input attribute value.

In accordance with the technique disclosed in Japanese Unexamined Patent Application Publication No. 2003-255992, the decision tree is generated considering the possibility that speech recognition results of the voice spoken in a user's answer are in error. The technique accounts for only the possibility that the speech recognition results of the voice in the user's answer and does not account for the possibility that the user's own answer to an inquiry is in error.

The related art techniques are not able to generate the decision tree by accounting for the possibility that the user's own answer to the inquiry is in error. The optimum order of inquiries is thus difficult to determine.

The present disclosure provides a decision tree generating apparatus that generates a decision tree that reduces the number of inquiries to a user even if the user's answer to each inquiry is in error when candidates of classification results are narrowed from answer results to the inquiries that are made to the user in dialog. The present disclosure also provides a method of the decision tree generation apparatus and a non-transitory computer-readable recording medium. The present disclosure also provides an inquiry system that reduces the number of inquiries to the user even if the user's answer is in error when the candidates of the classification results or search results are narrowed from the answer results to the inquiries that are made to the user in the dialog.

In accordance with an aspect of the disclosure, there is provided a decision tree generating apparatus. The decision tree generating apparatus includes an information gain calculator and a decision tree generator. When a classification target data set including a plurality of pieces of classification target data respectively having mutually different attributes with attribute values assigned thereto is hierarchically segmented into a plurality of subsets in a form of a decision tree, the information gain calculator calculates an amount of reduction in entropy of the pre-segmentation classification target data set caused by segmentation on each attribute of each piece of the classification target data included in a pre-segmentation data set, and calculates an information gain when the pre-segmentation data set is segmented in accordance with the attribute value of each attribute, based on the amount of reduction in the entropy and reliability that is an index representing correctness or incorrectness of a user's answer responsive to an inquiry asking about the attribute. The decision tree generator successively determines an attribute having a maximum information gain to be a node of the decision tree by recursively iterating the segmentation of the pre-segmentation data set in accordance with the attribute value of the attribute having the maximum information gain from among the information gains calculated on the attributes, and generates the decision tree that is to be used to determine an order of inquiries asking about the attributes in order to classify the pieces of classification target data by successively assigning the attribute value of the attribute having the maximum information gain to an edge of the node.

In the configuration described above, the order of inquiries is determined in view of the possibility that the user's answer to an inquiry is in error. More specifically, the information gain that reflects correctness or incorrectness of the user's answer is calculated by accounting for the amount of reduction in the entropy of data set as a result of segmenting the classification target data and reliability that is an index representing the correctness or incorrectness of the user's answer. The number of inquiries is thus reduced and the order of inquiries is determined by controlling the possibility that the user's answer in error causes an error in the classification results. The order of inquiries is thus determined such that an inquiry that reduces more the number of errors in the narrowing operation is made earlier, by accounting for an amount of reduction in the entropy to minimize the number of inquiries to narrow the classification target data and by accounting for the reliability of the user's answer. As a result, even if the user's answer is in error when the candidates of the classification results are narrowed from the answer results to the inquiries that are made to the user in the dialog, the decision tree that may reduce the number of inquiries to the user is thus generated.

The decision tree generating apparatus further includes a reliability calculator that calculates the reliability on each attribute from user's answer instance data that includes instances of a user's correct answer and a user's incorrect answer in response to an inquiry asking about the attribute. The information gain calculator calculates the information gain obtained when the pre-segmentation data set is segmented on a per attribute basis in accordance with the attribute value of each attribute, based on the reliability calculated by the reliability calculator and the amount of reduction in the entropy.

The reliability calculator calculates the reliability on each attribute from user's answer instance data that includes instances of the user's correct answer and the user's incorrect answer responsive to an inquiry asking about the attribute. The information gain calculator calculates the information gain obtained when the pre-segmentation data set is segmented on a per attribute basis in accordance with the attribute value of each attribute, based on the reliability calculated by the reliability calculator and the amount of reduction in the entropy. The reliability that precisely reflects the certainty of the user's answer is calculated from the user's answer instance data. The number of inquiries is thus reduced and the decision tree is generated that determines the order of inquiries controlling the possibility that the classification results are in error.

The reliability may include a correct answer rate of the user's answer responsive to the inquiry asking about the attribute, and the information gain calculator may calculate the information gain by multiplying the amount of reduction in the entropy by the correct answer rate.

In this configuration, the information gain is calculated by multiplying the amount of reduction in the entropy by the correct answer rate of the user's answer to the inquiry. The information gain thus obtained reflects the user's correct answer rate. The number of inquiries is reduced, and the decision tree is thus generated that determines the order of inquiries controlling more the possibility that the classification results are in error.

The user's answer instance data may include data concerning an answer time period until the user gives an answer in response to an inquiry. The correct answer rate may include a correct answer rate of an average answer time period of the user determined from a correlation between the answer time period and the correct answer rate, and the information gain calculator may calculate the information gain by multiplying the amount of reduction in the entropy by the correct answer rate of the average answer time period.

In the above configuration, the correct answer rate of the average answer time period of the user is determined from the correlation between the answer time period lasting until the user answers the inquiry and the correct answer rate. The information gain is calculated by multiplying the amount of reduction in the entropy by the correct answer rate of the average answer time period. The reliability that more precisely reflects the certainty of the user's answer is calculated. The number of inquiries is reduced and the decision tree is thus generated that determines the order of inquiries controlling more the possibility that the classification results are in error.

The reliability may include conditional entropy when a specific attribute value that is an answer to an inquiry asking about a specific attribute is acquired, and the information gain calculator may calculate the information gain by subtracting the conditional entropy from the amount of reduction in the entropy.

In the above configuration, the information gain is calculated by subtracting from the amount of reduction in the entropy the conditional entropy obtained when the specific attribute value that is the answer to the inquiry asking about the specific attribute is obtained. The information gain thus obtained precisely reflects the uncertainty of the user's answer using the conditional entropy. The number of inquiries is reduced and the decision tree is thus generated that reduces determines the order of inquiries controlling more the possibility that the classification results are in error.

The user's answer instance data may further include user information representing an attribute of the user. The reliability calculator calculates the reliability on the attribute of each user from the user's answer instance data, and the information gain calculator calculates the information gain on the attribute of each user, based on the reliability and the amount of reduction in the entropy.

In the above configuration, the information gain on the attribute of each user is generated based on the reliability and the amount of reduction in the entropy. The information gain thus calculated is appropriate for the attribute of each user. Depending on the attribute of each user, the number of inquiries is reduced and the decision tree is thus generated that determines the order of inquiries controlling more the possibility that the classification results are in error.

The decision tree generator may generate a single decision tree from the plurality pieces of classification target data.

The decision tree generator sets the classification target data set to be an initial value of the pre-segmentation data set, causes the information gain calculator to calculate the information gain when the pre-segmentation data set that is set in accordance with the attribute value of each attribute is segmented into the subsets, determines the attribute having the maximum information gain to be a node that segments the set pre-segmentation data set, segments the pre-segmentation data set into the subsets in accordance with the attribute value of the attribute having the maximum information gain, marks the attribute having the maximum information gain on each of the subsets, newly sets each of the subsets to be the pre-segmentation data set, recursively iterates the calculating, the determining, the segmenting, and the marking on the newly set pre-segmentation data, and causes the information gain calculator to calculate the information gain when the set pre-segmentation data set is segmented in accordance with the attribute value of an attribute, which has not been marked, from among the attributes.

According to another aspect of the disclosure, there is provided an inquiry system that generates classification results from a user's answer to an inquiry. The inquiry system includes a memory that stores a decision tree that is generated by the decision tree generating apparatus, an inquirer that outputs an inquiry in accordance with the decision tree stored on the memory, an acquirer that acquires the user's answer responsive to the inquiry from the inquirer, and a generator that generates the classification results responsive to the user's answer acquired by the acquirer.

In the above configuration, even if the user's answer is in error when an inquiry is made to the user in the dialog and the candidates of the classification results are narrowed from the answer results to the inquiries, the decision tree that reduces the number of inquiries to the user is thus generated.

The inquiry system may further include a history memory that stores inquiry order information representing an order of inquiries by the inquirer, attribute identification information that identifies an attribute corresponding to an inquiry by the inquirer, an attribute value that is an answer to the inquiry by the inquirer, and reliability on the attribute corresponding to the inquiry by the inquirer. The generator, after generating the classification results, may make an inquiry again asking about an attribute having reliability lower in correctness than a specific value by referencing the history memory.

In above configuration, when the user's answer to the inquiry has a lower accuracy level than a specific threshold value with respect to the once obtained classification results, the same inquiry may be made again. The accuracy level of the classification results is thus increased.

The disclosure thus implements not only the decision tree generating apparatus having the features described above but also the decision tree generating method that performs a process characteristic of the configuration of the decision tree generating apparatus. The process of the characteristic process included in the decision tree generating method may be implemented as a computer program that causes a computer to perform the characteristic process of the decision tree generating method. Embodiments described below offer effects similar to those of the decision tree generating apparatus.

According to another aspect of the disclosure, there is provided a decision tree generating method. The decision tree generating method includes, when a classification target data set including a plurality of pieces of classification target data respectively having mutually different attributes with attribute values assigned thereto is hierarchically segmented into a plurality of subsets in a form of a decision tree, calculating an amount of reduction in entropy of the pre-segmentation classification target data set caused by segmentation on each attribute of each piece of the classification target data included in a pre-segmentation data set, and calculating an information gain when the pre-segmentation data set is segmented in accordance with the attribute value of each attribute, based on the amount of reduction in the entropy and reliability that is an index representing correctness or incorrectness of a user's answer responsive to an inquiry asking about the attribute, and successively determining an attribute having a maximum information gain to be a node of the decision tree by recursively iterating the segmentation of the pre-segmentation data set in accordance with the attribute value of the attribute having the maximum information gain from among the information gains calculated on the attributes, and generating the decision tree that is to be used to determine an order of inquiries asking about the attributes in order to classify the pieces of classification target data by successively assigning the attribute value of the attribute having the maximum information gain to an edge of the node.

According to another aspect of the disclosure, there is provided a non-transitory computer-readable recording medium storing a program causing a computer to execute a process for generating a decision tree. The process includes, when a classification target data set including a plurality of pieces of classification target data respectively having mutually different attributes with attribute values assigned thereto is hierarchically segmented into a plurality of subsets in a form of a decision tree, calculating an amount of reduction in entropy of the pre-segmentation classification target data set caused by segmentation on each attribute of each piece of the classification target data included in a pre-segmentation data set, and calculating an information gain when the pre-segmentation data set is segmented in accordance with the attribute value of each attribute, based on the amount of reduction in the entropy and reliability that is an index representing correctness or incorrectness of a user's answer responsive to an inquiry asking about the attribute, and successively determining an attribute having a maximum information gain to be a node of the decision tree by recursively iterating the segmentation of the pre-segmentation data set in accordance with the attribute value of the attribute having the maximum information gain from among the information gains calculated on the attributes, and generating the decision tree that is to be used to determine an order of inquiries asking about the attributes in order to classify the pieces of classification target data by successively assigning the attribute value of the attribute having the maximum information gain to an edge of the node.

The computer program may be delivered using a non-transitory computer-readable recording medium, such as a compact disk read-only memory (CD-ROM), having the computer program recorded thereon, or via a communication network, such as the Internet.

Some elements and the remaining elements of the decision tree generating apparatus of an embodiment of the disclosure may be mounted among multiple computers in a system.

Each of the embodiments described below represents a specific example of the disclosure. Numerical values, shapes, elements, steps and the order of the steps in the embodiments are described for exemplary purposes only, and are not intended to limit the disclosure. Elements not described in independent claims indicative of a generic concept, from among the elements of the embodiments, may be any elements. Contents of the embodiments may be combined in use.

Embodiments

Embodiments of the disclosure are described with reference to the drawings. FIG. 1 is a block diagram of a configuration of a decision tree generating apparatus of an embodiment of the disclosure. The decision tree generating apparatus of FIG. 1 includes a decision tree generator 11, an information gain calculator 12, a user's answer reliability calculator 13, a classification target data memory 14, a user's answer instance data memory 15, and an inquiry order decision result memory 16.

The classification target data memory 14 stores multiple pieces of classification target data in which each of multiple attributes is assigned one of multiple attribute values. The classification target data is used to generate inquiry order decision results (decision tree) to be stored on the inquiry order decision result memory 16. The multiple pieces of classification target data are stored as a classification target data set. Each piece of the classification target data includes a data identity (ID) identifying data, an attribute value that corresponds to an answer responsive to an inquiry and is stored on a per attribute basis corresponding to contents of an inquiry, and a category corresponding to the classification results.

FIG. 2 illustrates contents of the classification target data set. Referring to FIG. 2, each piece of the classification target data is assigned attribute values (1 or 0) corresponding to four attributes x1, x2, x3, and x4. Each piece of the classification target data has one of categories (C1 through C8) in which each piece of the classification target data is classified. The classification target data having such a data structure is stored on the classification target data memory 14.

In accordance with the embodiment, a process of classifying diagnosis results from answers responsive to medical interviews is described as below. The process of the embodiment is not limited to this application. For example, the process of the embodiment finds applications in a customer management system or a sales system of electronic commerce. In such a case, in response to results of user's answers responsive to inquiries made to the user in dialog, the process narrows candidates of search results obtained from searching food, commodity items, music content, video content, and the like. The process of the embodiment also finds applications in a maintenance system. For example, the process performs a maintenance operation to diagnose faults of cars or devices, or a variety of applications including fortune-telling, or personality analysis.

The user's answer instance data memory 15 stores user's answer instance data including instances of a user's correct or incorrect answer responsive to an inquiry asking about the attribute of classification target data. More specifically, the user's answer instance data is an aggregate of answer results obtained by making an inquiry to users, with respect to each attribute of the classification target data stored on the classification target data memory 14, and a collection of instances indicating whether the user's answer responsive to the inquiry related to the attribute correctly reflects the user's states.

For example, in the user's answer instance data in the use case of a medical interview, multiple attributes are inquiries about the presence or absence of a user's subjective symptom. For example, the inquiries may include "Do you have a headache?", and "Do you have dizziness?". The user's answer instance data is data that verifies whether the answer as to the user's subjective symptom correctly reflects the user's state. If a user has no headache, and the user's reply to the inquiry "Do you have a headache?" is "No, I don't", the user's answer correctly reflects the user's state (correct answer instance). If the user's reply is "Yes, I do", the user's answer does not reflect the user's state (incorrect answer instance).

The user's correct answer rate is considered to be higher in the case of a headache because the headache sufferer clearly feels. The user's correct answer rate is considered to be lower in the case of dizziness because the dizziness sufferer has slight difficulty in clearly feeling it. As the subjective symptom is easier to perceive, the user's correct answer rate to an inquiry asking about the presence or absence of the subject symptom becomes higher. Conversely, as the subjective symptom is more difficult to perceive, the user's correct answer rate to an inquiry asking about the presence or absence of the subject symptom becomes lower.

The user's answer reliability calculator 13 collects the user's answer instance data stored on the user's answer instance data memory 15, and calculates, as reliability, a percentage of the user's correct answers to inquiries asking about attributes (correct answer rate). The reliability is an index that represents the user's correct answer rate to an inquiry asking about an attribute.

FIG. 3 illustrates an example of reliability of a user's answer of each attribute calculated by the user's answer reliability calculator 13. In the example of FIG. 3, the reliability on the attribute x1, namely, the correct answer rate to an inquiry asking about the reliability on the attribute x1 is 60%. The reliabilities of the attributes x2, x3, and x4 are respectively 80%, 90%, and 70%. The correct answer rate of the attribute x3 is the highest, and the correct answer rate of the attribute x1 is the lowest. The reliabilities of the answers to the inquiries about the attributes calculated by the user's answer reliability calculator 13 are used as inputs to the information gain calculator 12 that calculates the information gain.

When the classification target data set including multiple pieces of classification target data respectively having multiple different attributes with attribute values assigned thereto is hierarchically segmented into subsets in the form of a decision tree, the information gain calculator 12 calculates, on a per attribute basis of the classification target data included in the pre-segmentation data set, an amount of reduction in the entropy of the data set caused by segmentation. The information gain calculator 12 also calculates the information gain, based on the calculated amount of entropy and the reliability calculated by the user's answer reliability calculator 13, when the pre-segmentation data set is segmented in accordance with the attribute value of each attribute.

The decision tree generator 11 receives data serving as a classification target stored on the classification target data memory 14. Using the information gain on each attribute calculated by the information gain calculator 12, the decision tree generator 11 generates in the form of a tree the order of attribute checks (inquiries) according to which the classification target data is classified. More specifically, the decision tree generator 11 recursively iterates a process to segment the pre-segmentation data set in accordance with the attribute value of an attribute having a maximum information gain from among multiple information gains calculated on the attributes by the information gain calculator 12. The decision tree generator 11 thus successively determines the attribute having a maximum information gain to be a node of the decision tree, successively assigns to an edge of the node the attribute value of the attribute having the maximum information gain, and thus generates a single decision tree from the multiple pieces of classification target data.

The inquiry order decision result memory 16 stores inquiry order decision results as the decision tree generated by the decision tree generator 11.

The decision tree generating apparatus of the embodiment is not limited to the above-described configuration. Some or all of the classification target data memory 14, the user's answer instance data memory 15, and the inquiry order decision result memory 16 may be dispensed with, and the classification target data and the user's answer instance data may be acquired from an external server or the data concerning the decision tree generated by the decision tree generator 11 may be stored onto an external storage device. Alternatively, the user's answer reliability calculator 13 may be dispensed with, and the reliability may be acquired from an external server.

The decision tree generating process of the decision tree generating apparatus thus constructed is described below with reference to a flowchart of FIG. 4.

Figure 4:
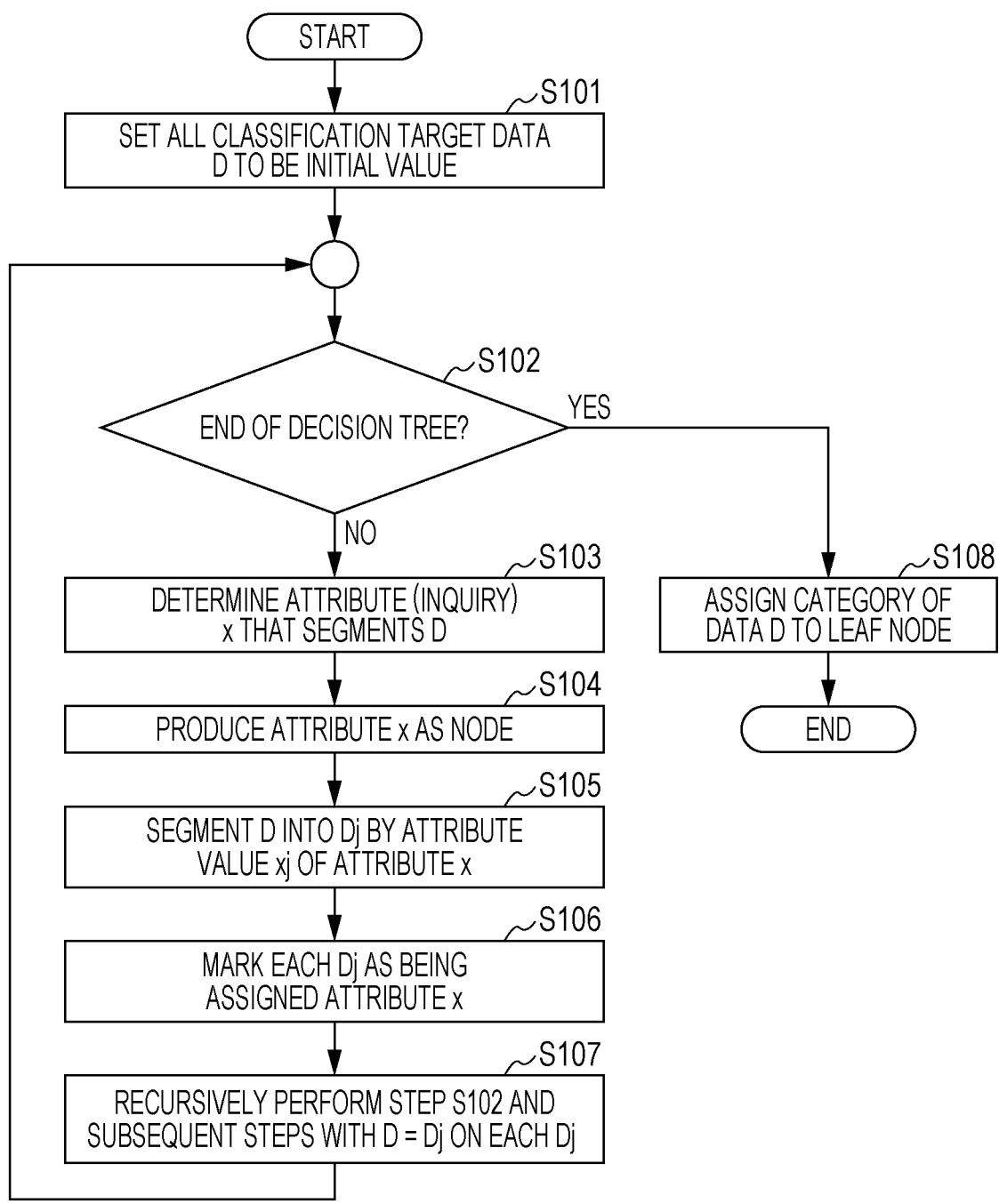
FIG. 4 is a flowchart illustrating an example of a process of the decision tree generating apparatus of FIG. 1 that generates a decision tree in view of the reliability of the user's answer.

Referring to FIG. 4, the decision tree generator 11 reads all the classification target data from the classification target data memory 14, and sets all the classification target data to be an initial value of a data set D which is a selection target of the attribute value (step S101).

The decision tree generator 11 determines whether the data set D satisfies the condition of a terminal end of the decision tree (step S102). More specifically, the decision tree generator 11 determines that the condition of the terminal end of the decision tree is satisfied if the following condition is satisfied. The condition is determined to be satisfied if the categories of the classification target data included in the data set D are narrowed to one category or if all the attributes of the classification target data included in the data set D are assigned to nodes with no attribute is available any longer to be newly assigned to a node.

If the answer to determination operation in step S102 is yes, the decision tree generator 11 assigns to a leaf node a category imparted to the classification target data included in the data set D (step S108). The process thus ends.

If the answer to the determination operation in step S102 is no, the decision tree generator 11 causes the information gain calculator 12 to calculate the information gain on each attribute, and determines an attribute having a maximum information gain to be an attribute (inquiry) x that is used to segment the data set D (step S103).

The operation in step S103 is described in detail with reference to the flowchart of FIG. 5.

Figure 5:
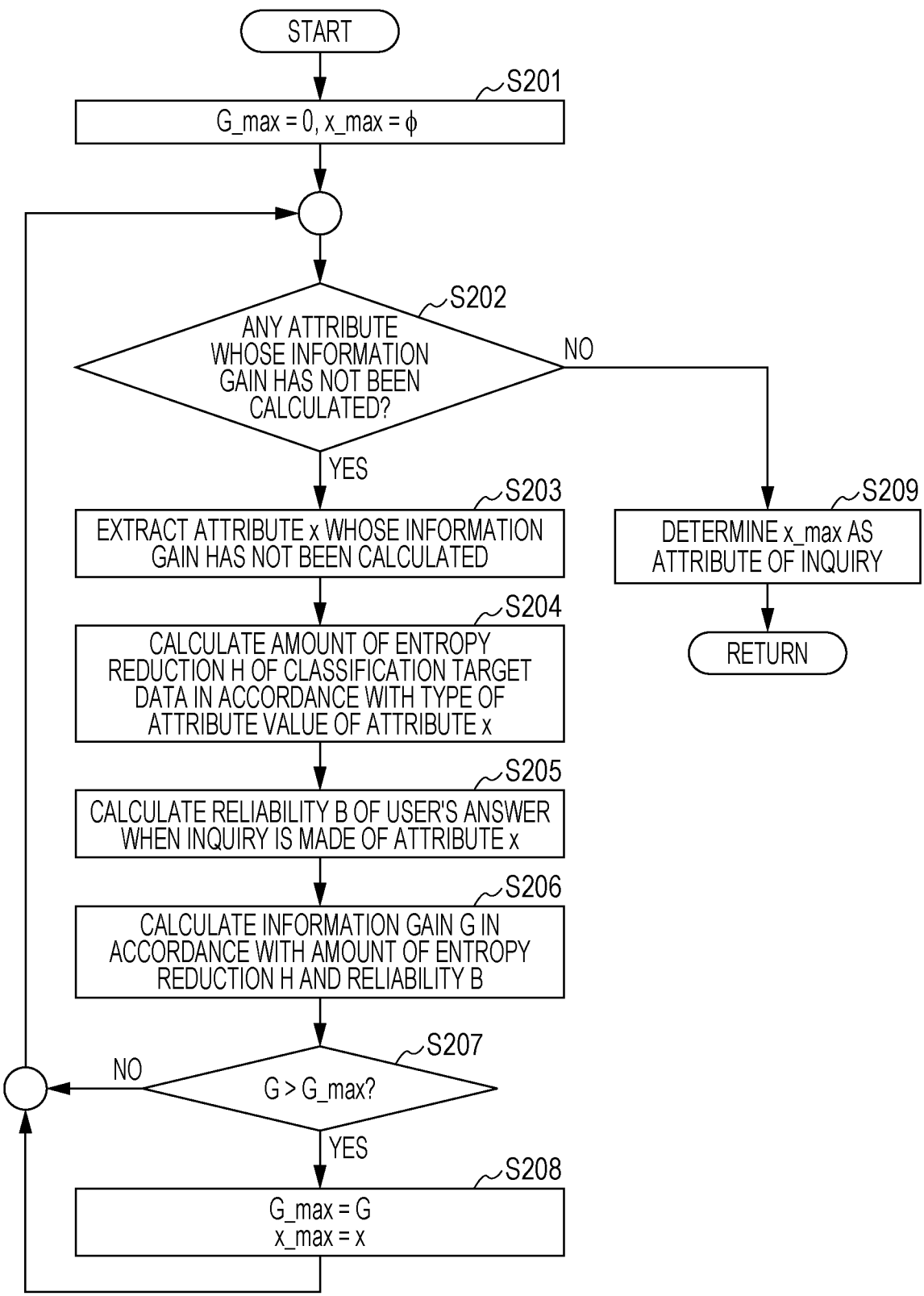
FIG. 5 is a flowchart illustrating an example of a process that determines an attribute that is assigned to a node of the decision tree in the decision tree generation process of FIG. 4.

As illustrated in FIG. 5, the decision tree generator 11 initializes a variable G_max that maintains the maximum value of the information gain and a variable x_max that maintains an attribute that gives the maximum value of the information gain, respectively to 0 and an empty value ($\phi$) (step S201).

The decision tree generator 11 determines whether there is an attribute whose information gain has not been calculated among attributes that have not been marked as being assigned in the data set D (step S202).

If the decision tree generator 11 determines that there is no attribute whose information gain has not been calculated, the decision tree generator 11 determines the attribute maintained at the variable x_max to be an attribute that is used to segment the data set (step S209). Processing returns to step S104 of FIG. 4.

If the decision tree generator 11 determines in step S202 that there is an attribute whose information gain has not been calculated, the decision tree generator 11 extracts the attribute x whose information gain has not been calculated (step S203).

The decision tree generator 11 instructs the information gain calculator 12 to calculate an amount of reduction of entropy H in accordance with the type of the attribute value of the attribute x, and the information gain calculator 12 then calculates the amount of reduction of entropy H in accordance with the type of the attribute value of the attribute x (step S204). More specifically, the information gain calculator 12 calculates the amount of reduction of entropy H in accordance with formula (1):

$$H = \sum_i -P_D(C_i)\log_2 P_D(C_i) - \sum_j P(x_j)\sum_i -P_{D_j}(C_i)\log_2 P_{D_j}(C_i) \quad (1)$$

The first sum on the right side of formula (1) represents an entropy of the data set D before being segmented in accordance with the attribute x, and is the sum of information entropy of an appearance probability of a category Ci (the suffix i represents a category) attached to the classification target data included in the data set D. The second sum of the right side of formula (1) represents an entropy of each subset Dj of the segmented data set that is segmented in accordance with an attribute value xj of the attribute x (the suffix j represents an attribute value). In a similar way as described above, the information entropy of the appearance probability of the category Ci is determined on a per subset Dj basis, the information entropy is multiplied by the appearance probability of the attribute xj, and the resulting products are summed.

The information gain calculator 12 instructs the user's answer reliability calculator 13 to calculate reliability B of a user's answer when an inquiry is made about the attribute x. The user's answer reliability calculator 13 calculates the reliability B of the user's answer when the inquiry is made of the attribute x, and then outputs the reliability B to the information gain calculator 12 (step S205).

The information gain calculator 12 calculates an information gain G using the amount of reduction of entropy H and the reliability B in accordance with the following formula (2), and outputs the calculated information gain G to the decision tree generator 11 (step S206):

$$G = H \times B \quad (2)$$

The decision tree generator 11 determines whether the information gain G is higher than the maximum information gain G_max (step S207).

If the relationship G>G_max holds in step S207, the decision tree generator 11 updates G_max with the information gain G and x_max with the attribute x (step S208). Processing returns to step S202 to repeat the process. On the other hand, if the relationship G>G_max does not hold in step S207, the decision tree generator 11 simply returns to step S202 to repeat the process again.

Through the above process, the information gain of each attribute is calculated with reference to the data set D, a maximum information gain is identified from the calculated information gains, and the attribute having the maximum information gain is determined to be the attribute x according to which the data set D is segmented.

Turning back to the flowchart of FIG. 4, in step S103, the decision tree generator 11 determines the attribute x that is used to segment the data set D, and produces a node of the attribute x (step S104).

The decision tree generator 11 segments the data set D into multiple subsets Dj (j=1, 2, . . . ) as segmented data sets in accordance with the attribute value xj (j=1, 2, . . . ) of each attribute x, and assigns the attribute value xj of each attribute x to the edge of a node (step S105).

The decision tree generator 11 marks each subset Dj as being assigned with the attribute x (step S106).

The decision tree generator 11 newly sets each subset Dj to be Dj as a data set D. More specifically, the decision tree generator 11 sets D=Dj, and recursively iterates the process starting with step S102 (step S107).

Through the above process, the decision tree generator 11 generates a decision tree as inquiry order decision results from multiple pieces of classification target data and stores the decision tree onto the inquiry order decision result memory 16.

Figure 6:
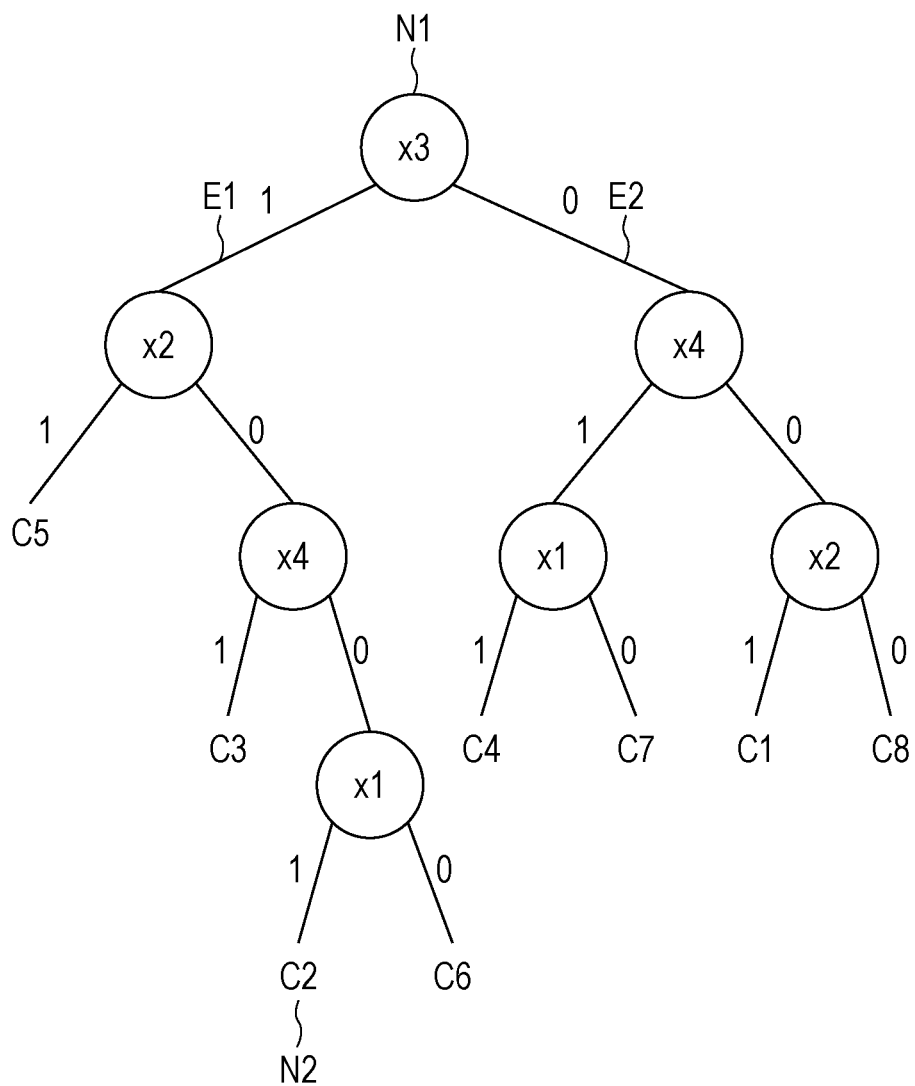
FIG. 6 illustrates an example of the decision tree generated by the decision tree generating apparatus of FIG. 1.

FIG. 6 illustrates an example of the decision tree that is generated by calculating the information gain from the classification target data of FIG. 2 using the reliability of the user's answer of FIG. 3 in accordance with the process described above. FIG. 7 illustrates an example of the decision tree by calculating the information gain using the amount of reduction of entropy rather than using the reliability of the user's answer. FIG. 6 and FIG. 7 illustrate the nodes, edges, categories, attributes, and attribute values of the decision tree using identical symbols.

In the decision tree of FIG. 7, the information gain is calculated using only the amount of reduction of entropy rather than using the reliability of the user's answer. The attribute assigned to the root node N1 is the attribute x1. In the decision tree of FIG. 6, the information gain is calculated by multiplying the amount of reduction of entropy by the reliability of the user's answer. The attribute assigned to the root node N1 is the attribute x3.

Referring to FIG. 3, the reliability of the user's answer to the inquiry about the attribute x1 is 60% and is lower in value than the other attributes. The information gain of the attribute x1 is lower than the information gains of the other attributes, and the attribute giving the maximum information gain is the attribute x3. Since one decision tree is generated in view of the reliability of the user's answer related to attribute in the embodiment, the order of inquiries smaller in number than those of related art is thus determined.

In accordance with the embodiment, the information gain is calculated using as the reliability the correct answer rate of the user's answer in accordance with formula (2). The method of determining the reliability of the user's answer is not limited to the method described above, and a variety of modifications is possible to the method described above.

In the medical interview, for example, a correlation between the period of time from the inquiry lasting until the user's answer is obtained, and a rate at which the user gives a correct answer is determined. When the inquiries are made, the user's correct answer rate is determined from the mean value of the periods of time lasting until the user's answers are obtained.

The user's answer instance data memory 15 stores user's answer instance data. The user's answer instance data includes instances of user's correct answers and incorrect answers responsive to inquiries asking about attributes, and an answer time period until each user replies to each inquiry. The user's answer reliability calculator 13 determines from the user's answer instance data a correlation between the answer time period and the correct answer rate, calculates the correct answer rate with respect to the mean answer time period from the determined correlation. The information gain calculator 12 calculates the information gain by multiplying the amount of reduction of entropy by the correct answer rate of the mean answer time period.

The reliability of the user's answer may be regarded as being different depending on the attribute of the user. For example, the user's answer instance data may be differentiated according to a personal attribute, for example, age, sex, or occupation, or the category of school, for example, infant, schoolchild, junior high school student, senior high school student, university student, or adult. The reliability of the user's answer is calculated on a per user's attribute basis, and is then selected in response to the attribute of the actual user who answers the inquiry.

The user's answer instance data memory 15 stores the user's answer instance data. The user's answer instance data includes instances of user's correct answers and incorrect answers responsive to inquiries asking about attributes, and user information representing the attributes of users. The user's answer reliability calculator 13 determines the correct answer rate on a per user's attribute basis, and the information gain calculator 12 calculates the information gain on a per user's attribute basis by multiplying the amount of reduction of entropy by the correct answer rate determined on each user's attribute.

The reliability of the user's answer may be calculated on each user from an answer status during his or her past medical interview.

In accordance with the embodiment, the information gain G is calculated in accordance with formula (2). The information gain calculation method that determines the information gain from the amount of reduction of entropy and the reliability of the user's answer is not limited to the above-described method. A variety of modifications is possible. For example, when an answer (attribute value) y is obtained in response to an inquiry to a symptom (attribute) x, the reliability B' of the user's answer is set to be conditional entropy H(Y|X) and is calculated in accordance with formula (3). An information gain G' may be calculated in accordance with formula (4) using the reliability B' determined in accordance with formula (3) and the amount of reduction of entropy H determined in accordance with formula (1):

$$B' = H(Y|X) \quad (3)$$
$$= \sum_x P(X=x)H(Y|x)$$
$$= \sum_x P(X=x)\sum_y P(Y=y|X=x)\log P(Y=y|X=x)$$
$$G' = H - B' \quad (4)$$

Let P(X) represent a probability that a user has actually a symptom x. The reliability B' of the user's answer is obtained by calculating the entropy of a conditional probability P(H|X) that the user answers "yes" or "no" if the user has or does not have the symptom x. More specifically, The reliability B' of the user's answer represents the magnitude of an amount of information (entropy) of the uncertainty (incorrectness) of the user's answer, and is an index representing the uncertainty of the user's answer to the inquiry asking about the attribute. If the reliability B' of the user's answer is used, the information gain obtained in response to the inquiry asking about the symptom (attribute) x is smaller than by the reliability B' by subtracting the reliability B' of the user's answer from the amount of reduction of entropy H as expressed in formula (4).

The user's answer reliability calculator 13 calculates as the reliability B' the conditional entropy when a specific attribute value is obtained as an answer to an inquiry asking about a specific attribute. The information gain calculator 12 calculates the information gain G' by subtracting the reliability B' as the conditional entropy from the amount of reduction of entropy H. The effect is that is achieved when the reliability B' indicating an index representing the incorrectness of the user's answer to the inquiry asking about the attribute is used is similar to the effect that is achieved when the reliability B indicating an index representing the correctness of the user's answer to the inquiry asking about the attribute is used.

A medical interview system is described below. The medical interview system is an inquiry system that generates classification results from a user's answer to an inquiry using a decision tree generated by the decision tree generating apparatus.

Figure 8:
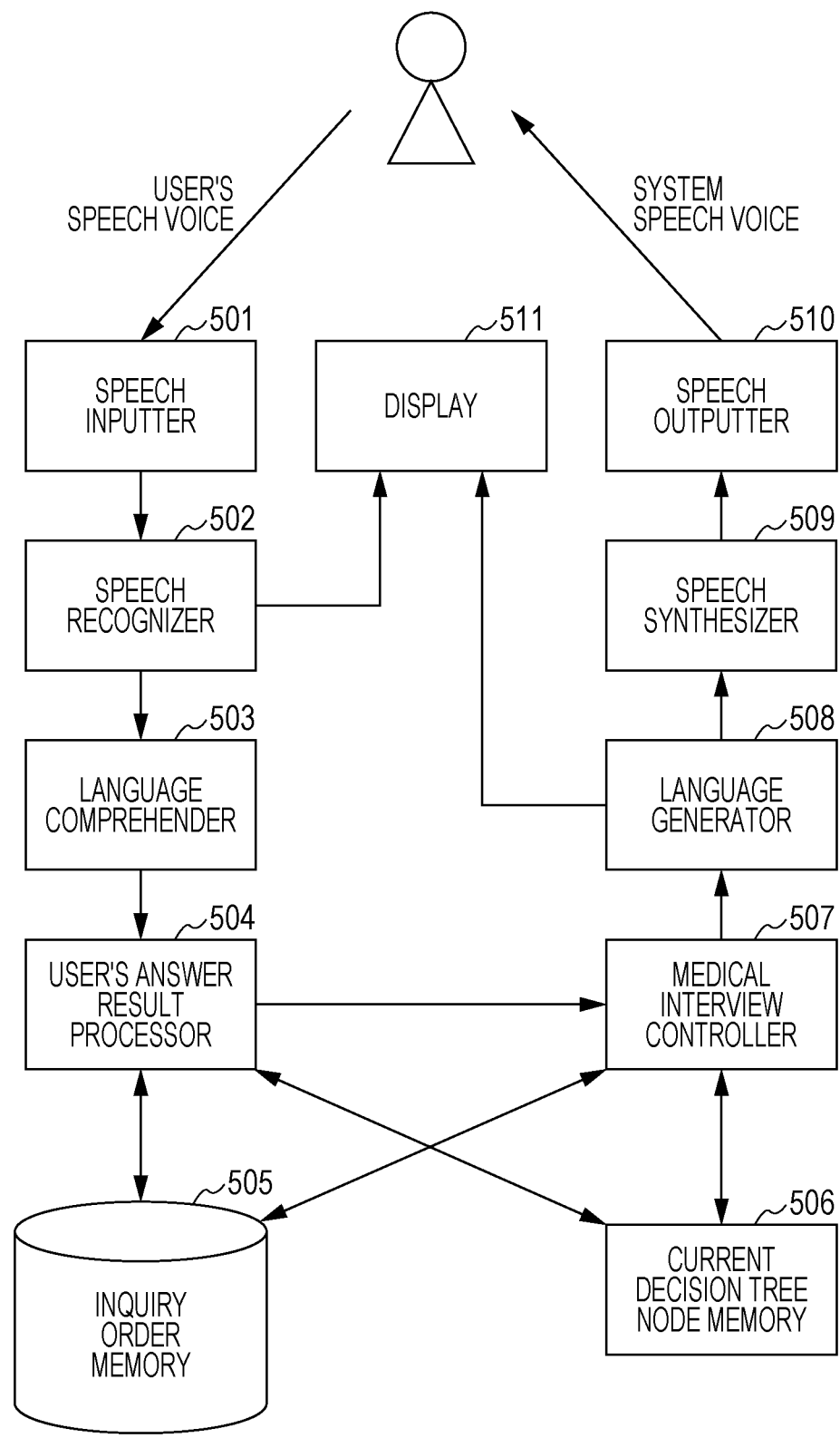
FIG. 8 illustrates a configuration of a medical interview system using the decision tree generated by the decision tree generating apparatus of an embodiment of the disclosure.

FIG. 8 is a block diagram illustrating a configuration of a medical interview system that accounts for inquiry order decision results (the decision tree) that is generated by the decision tree generating apparatus of an embodiment of the disclosure. Referring to FIG. 8, the interview system includes a speech inputter 501, a speech recognizer 502, a language comprehender 503, a user's answer result processor 504, an inquiry order memory 505, a current decision tree node memory 506, a medical interview controller 507, a language generator 508, a speech synthesizer 509, a speech outputter 510, and a display 511.

The inquiry order memory 505 stores the decision tree generated by the decision tree generating apparatus of FIG. 1. The language generator 508, the speech synthesizer 509, and the speech outputter 510 output inquiries in accordance with the decision tree stored on the inquiry order memory 505. The speech inputter 501, the speech recognizer 502, and the language comprehender 503 acquire user's answers responsive to the inquiries. The user's answer result processor 504, the current decision tree node memory 506, and the medical interview controller 507 generate classification results responsive to the acquired answers, and the display 511 displays an explanation of the classification results.

In the medical interview system, the inquiry order memory 505 corresponds to an example of a memory. The language generator 508, the speech synthesizer 509, and the speech outputter 510 correspond to an example of an inquirer. The speech inputter 501, the speech recognizer 502, and the language comprehender 503 correspond to an example of an acquirer. The user's answer result processor 504, the current decision tree node memory 506, and the medical interview controller 507 correspond to an example of a generator.

Figure 9:
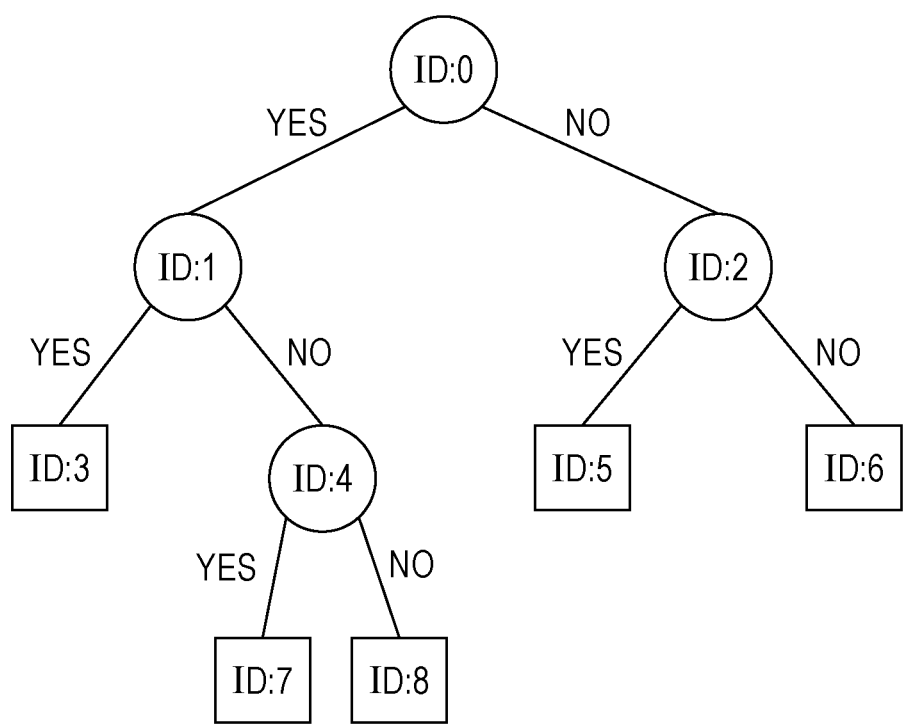
FIG. 9 illustrates an example of the decision tree stored on an inquiry order memory in the medical interview system of FIG. 8.

FIG. 9 illustrates an example of the decision tree stored on the inquiry order memory 505. FIG. 10 illustrates an example of a data structure of the decision tree when the decision tree of FIG. 9 is stored onto the inquiry order memory 505. When the decision tree generating apparatus of FIG. 1 has generated the decision tree of FIG. 9, the inquiry order memory 505 has stored the decision tree of FIG. 9 using the data structure of FIG. 10.

A symbol written on each node of the decision tree representing the order of inquiries represents a node ID. The data structure of the decision tree stored on the inquiry order memory 505 associates, on each node, a node ID, node contents indicating an inquiry corresponding to the attribute of the node or a medical interview result corresponding to the attribute of the node, a node ID of a node to which processing proceeds if the node contents indicate an inquiry and the user's answer to the inquiry is yes, and a node ID of a node to which processing proceeds if the node contents indicate an inquiry and the user's answer to the inquiry is no.

If the "node ID" is "0", "YES-NO (headache)" representing an inquiry asking about the attribute of the node is stored at the "node contents". "1" is stored at a YES column indicating the node ID of the node to which processing proceeds if the user's answer is yes. "2" is stored at a NO column indicating the node of the node to which processing proceeds if the user's answer is no. If the "node ID" is "3", "DIAG (vvv)" representing medical interview results is stored at the "node contents". Since the node contents are medical interview results, no data is stored at the YES and NO columns.

Figure 11:
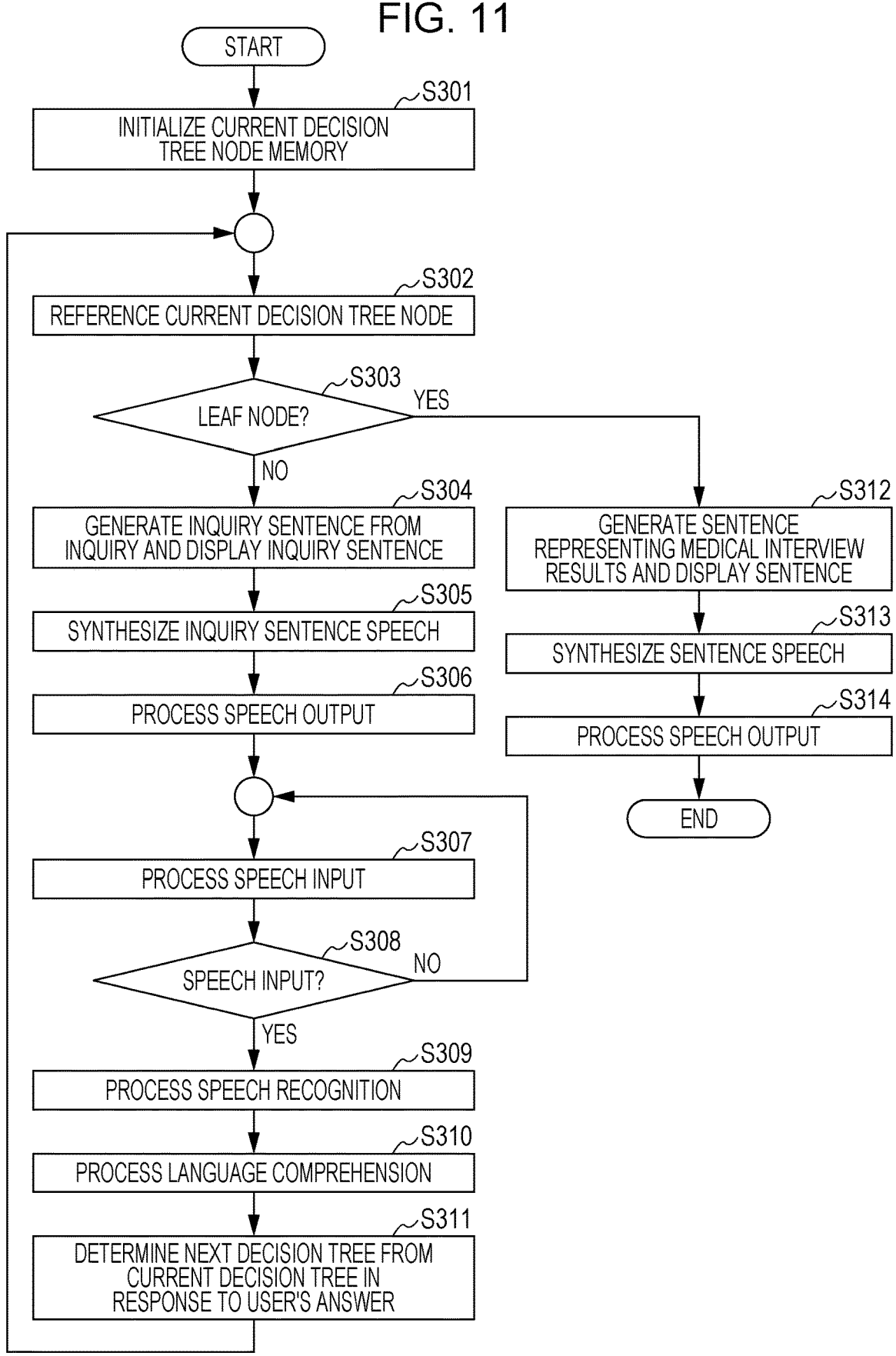
FIG. 11 is a flowchart illustrating a process of the medical interview system of FIG. 8.

FIG. 11 is a flowchart illustrating the process of the medical interview system of FIG. 8. The operation of each element of the block diagram of FIG. 8 and the process of the medical interview system are described in accordance with the flowchart of FIG. 11.

The medical interview controller 507 initializes the ID of a current decision tree node stored on the current decision tree node memory 506 to the node ID of the root node of the decision tree of the inquiry order memory 505 (step S301).

The medical interview controller 507 acquires the node ID by referencing the current decision tree node stored on the current decision tree node memory 506 (step S302). More specifically, the medical interview controller 507 acquires the node ID identifying the node.

The medical interview controller 507 acquires from the inquiry order memory 505 the node contents of the acquired node ID to determine whether the node is a leaf node (step S303). If the node contents are an inquiry (for example, YES_NO (AAA) and "AAA" herein represents a symptom), the node is not a leaf node. If the node contents are medical interview results (for example, DIAG (ZZZ) and "ZZZ" represents medical interview results), the node is a leaf node.

If it is determined in step S303 that the node is a leaf node, the medical interview controller 507 sends to the language generator 508 the medical interview results as the node contents, and the language generator 508 converts the medical interview results into an explanation of a natural language (for example, "You may be suffering from a disease called 'ZZZ'"), and sends the explanation to the speech synthesizer 509 and the display 511. The display 511 displays the explanation in text (step S312).

The speech synthesizer 509 synthesizes a speech for the explanation (step S313). The speech outputter 510 outputs the speech signal synthesized by the speech synthesizer 509 (step S314) so that a user may hear the spoken explanation. The process thus ends.

If it is determined in step S303 that the node is not a leaf node, the medical interview controller 507 sends to the language generator 508 the inquiry as the node contents ("AAA", for example), and the language generator 508 converts the inquiry into a question sentence of a natural language (for example, "Do you have 'AAA'?"), and sends the question sentence to the speech synthesizer 509 and the display 511. The display 511 displays the question sentence in text (step S304).

The speech synthesizer 509 synthesizes a speech by reading the question sentence (step S305). The speech outputter 510 outputs the synthesized speech signal (step S306) so that the user may hear the question sentence.

The user then consciously speaks his or her answer in response to the spoken question sentence. The speech inputter 501 is continuously ready to receive a speech input (step S307), and determines whether the speech input has been received from the user (step S308).

If the speech input is not detected in step S308, the speech inputter 501 returns to step S307 to wait on standby for a speech input. If a speed input is detected in step S308, the speech inputter 501 detects the end of the speech input, and sends the speech input to the end thereof as a speech signal to the speech recognizer 502.

Through a speech recognition process, the speech recognizer 502 converts the speech signal into a character string as the speech recognition results, and sends the character string to the language comprehender 503 and the display 511. The display 511 displays the character string (step S309).

The language comprehender 503 receives the character string as the speech recognition results, and language-analyzes the character string to convert the user speech into semantic information (step S310). In the medical review system of the embodiment, the speech of the user's answer is an answer responsive to an inquiry asking about his or her subjective symptom, and there are two types of information including the semantic information "YES" that is the answer when the user has the symptom asked about and the semantic information "NO" that is the answer when the user does not have the symptom asked about. The language comprehender 503 converts the character string as the speech recognition results into the semantic information "YES" or "NO".

The user's answer result processor 504 acquires the ID of the current decision tree node stored on the current decision tree node memory 506, selects between the node ID for the YES answer and the node ID of the NO answer in accordance with the semantic information converted by the language comprehender 503, determines the node ID to proceed to next, updates the ID of the current decision tree node of the current decision tree node memory 506 with the determined node ID, and then returns to step S302 (step S311).

Through the process described above, the user may know the most likely diagnosis results from his or her subjective symptom by answering the inquiries from the medical interview system.

Figure 12:
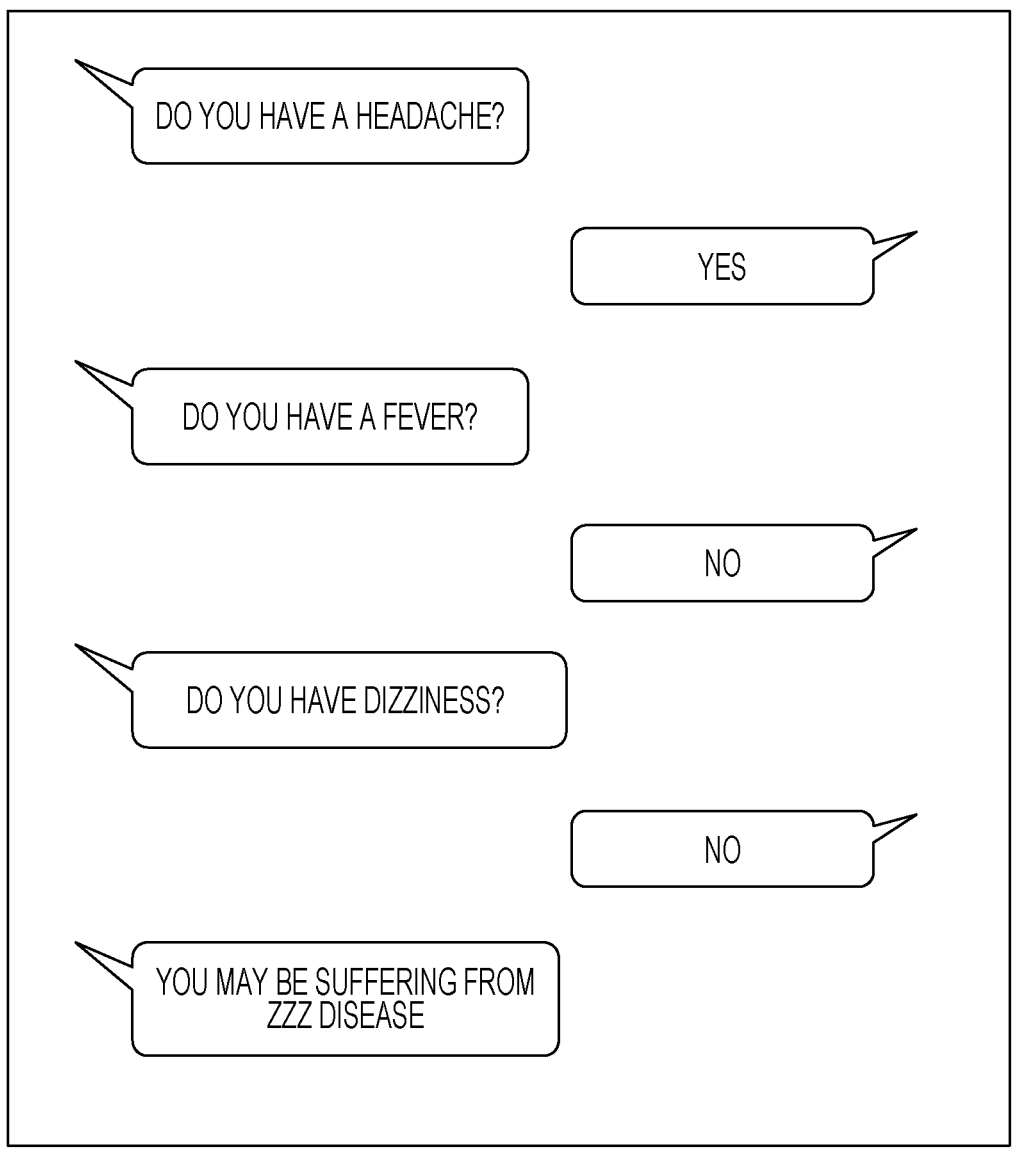
FIG. 12 illustrates an example of display contents on a display when an interview is performed on the medical interview system of FIG. 8.

FIG. 12 illustrates an example of the medical interview displayed on the display 511 when the user answers the inquiries that are generated in accordance with the decision tree indicating the inquiry order on the inquiry order memory 505 illustrated in FIG. 10.

In the inquiry order, the inquiries about symptoms including a headache, to which the user consciously answers, are followed by the inquiries including dizziness, which the user does not necessarily clearly feel. If there is a possibility that the user may wrongly answer an inquiry about a subjective symptom, the medical interview may be performed in a manner such that the possibility of erroneous diagnosis results is reduced.

The medical interview system performs a speech dialog, taking into consideration inquiry order decision results generated by the decision tree generating apparatus of an embodiment of the disclosure. When the medical interview results are obtained in accordance with the process illustrated in FIG. 10, the same inquiries are made again in view of low correctness of the user's answers to the inquiries performed heretofore. A determination is made to check whether there is a change in the user's answer to the inquiry asked for the second time, and the certainty of the obtained medical interview is thus increased.

Figure 13:
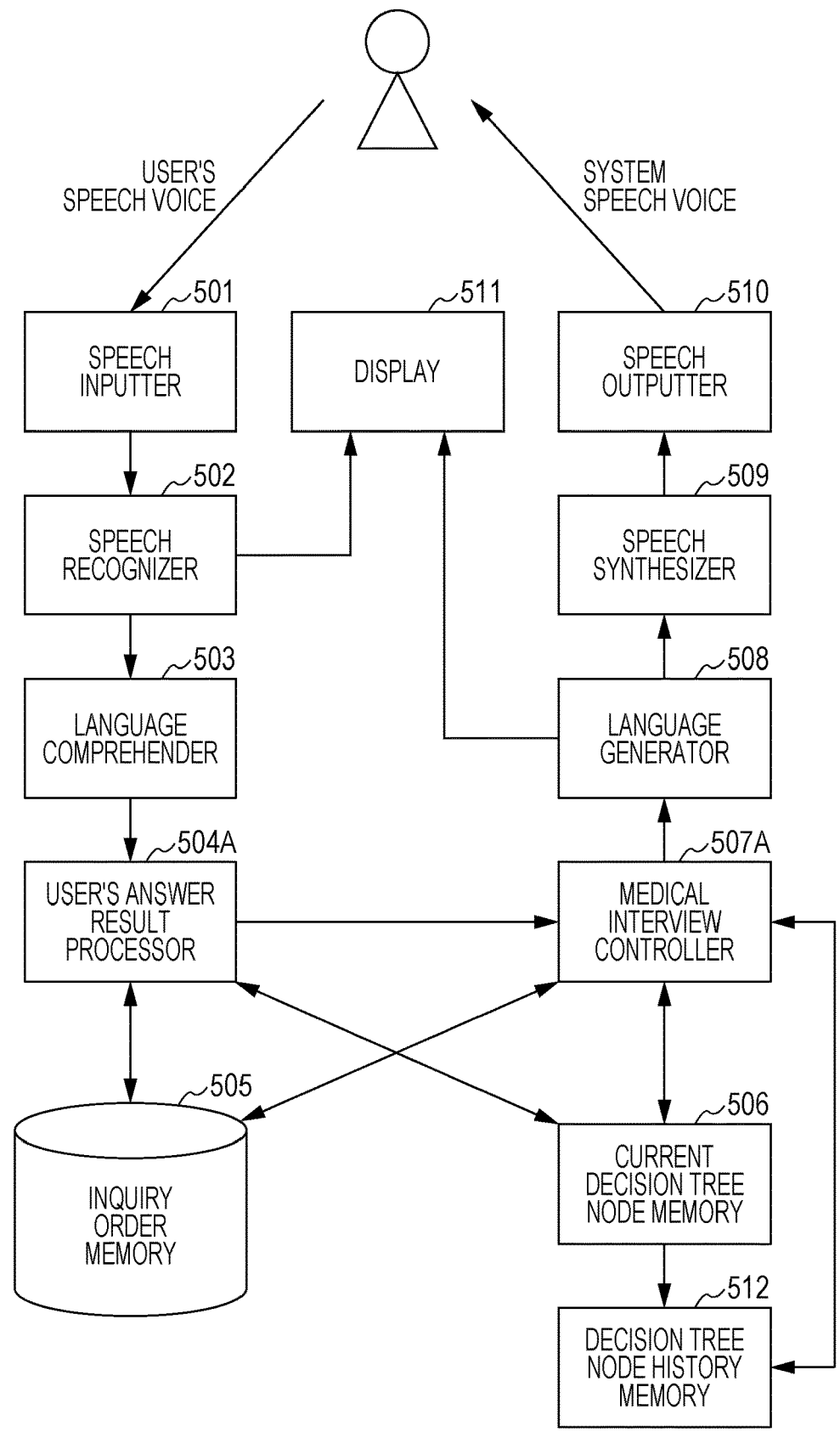
FIG. 13 illustrates a configuration of another medical interview system that uses a decision tree generated by a decision tree generating apparatus of an embodiment of the disclosure.

FIG. 13 illustrates a configuration of another medical interview system that uses a decision tree generated by the decision tree generating apparatus of an embodiment of the disclosure. The medical interview system of FIG. 13 increases the certainty of the medical interview results by making the inquiry for the second time.

The medical interview system of FIG. 13 is different from the medical interview system of FIG. 8 in that the user's answer result processor 504 and the medical interview controller 507 are respectively replaced with the user's answer result processor 504A and the medical interview controller 507A and that a decision tree node history memory 512 is added. The rest of the medical interview system of FIG. 13 remains unchanged from the medical interview system of FIG. 8, and the detailed discussion thereof is omitted herein.

FIG. 14 illustrates an example of history information of a decision tree node stored on the decision tree node history memory 512. In the history information of the decision tree node of FIG. 14, each row in the table represents history information of one decision tree node. The leftmost column of the table lists an order number of each inquiry in the medical interview, the second column next to the leftmost column lists a node ID of the decision tree, the third column to the right of the second column lists answer results of a user responsive to the inquiry corresponding to the node ID of the decision tree, and the rightmost column lists a reliability value (a correct answer rate) of the user's answer to the inquiry asking about the attribute identified by the node ID of the decision tree.

In this way, the decision tree node history memory 512 stores the order number of each inquiry that is inquiry order information representing the order of the inquiry, the node ID of the decision tree that is attribute identification information identifying the attribute corresponding to the inquiry, the answer results of the user representing the attribute value that is an answer to the inquiry, and the reliability on the attribute corresponding to the inquiry.

As the medical interview is in progress, the medical interview controller 507A records on the decision tree node history memory 512 a history about which node of the decision tree been used. More specifically, each time the decision tree node to be stored on the current decision tree node memory 506 is updated, history information of the decision tree node used as the inquiry is added to the end of the list of the history table stored on the decision tree node history memory 512.

After the medical interview is complete, the medical interview controller 507A references the decision tree node history memory 512 and makes again the inquiry asking about the attribute having reliability with a lower accuracy than a specific value. Alternatively, after the medical interview results have been determined, the medical interview controller 507A references the decision tree node history memory 512 and makes the inquiry again by tracing back the decision tree node having the finalized medical interview results (starting with the history information of the decision tree node at the end of the list).

The user's answer result processor 504A determines whether the user's answer to the repeated inquiry matches the user's answer result indicated by the history information of the decision tree node on the decision tree node history memory 512.

If the user's answer to the repeated inquiry fails to match the user's answer result indicated by the history information of the decision tree node on the decision tree node history memory 512, the medical interview controller 507A makes the medical interview again starting with the inquiry to which the user has given a different answer.

In the medical interview system, the inquiry order memory 505 corresponds to an example of the memory, the language generator 508, the speech synthesizer 509, and the speech outputter 510 correspond to an example of the inquirer. The speech inputter 501, the speech recognizer 502, and the language comprehender 503 correspond to an example of the acquirer, the user's answer result processor 504A, the current decision tree node memory 506, and the medical interview controller 507A correspond to an example of the generator, and the decision tree node history memory 512 corresponds to an example of a history memory.

Figure 15:
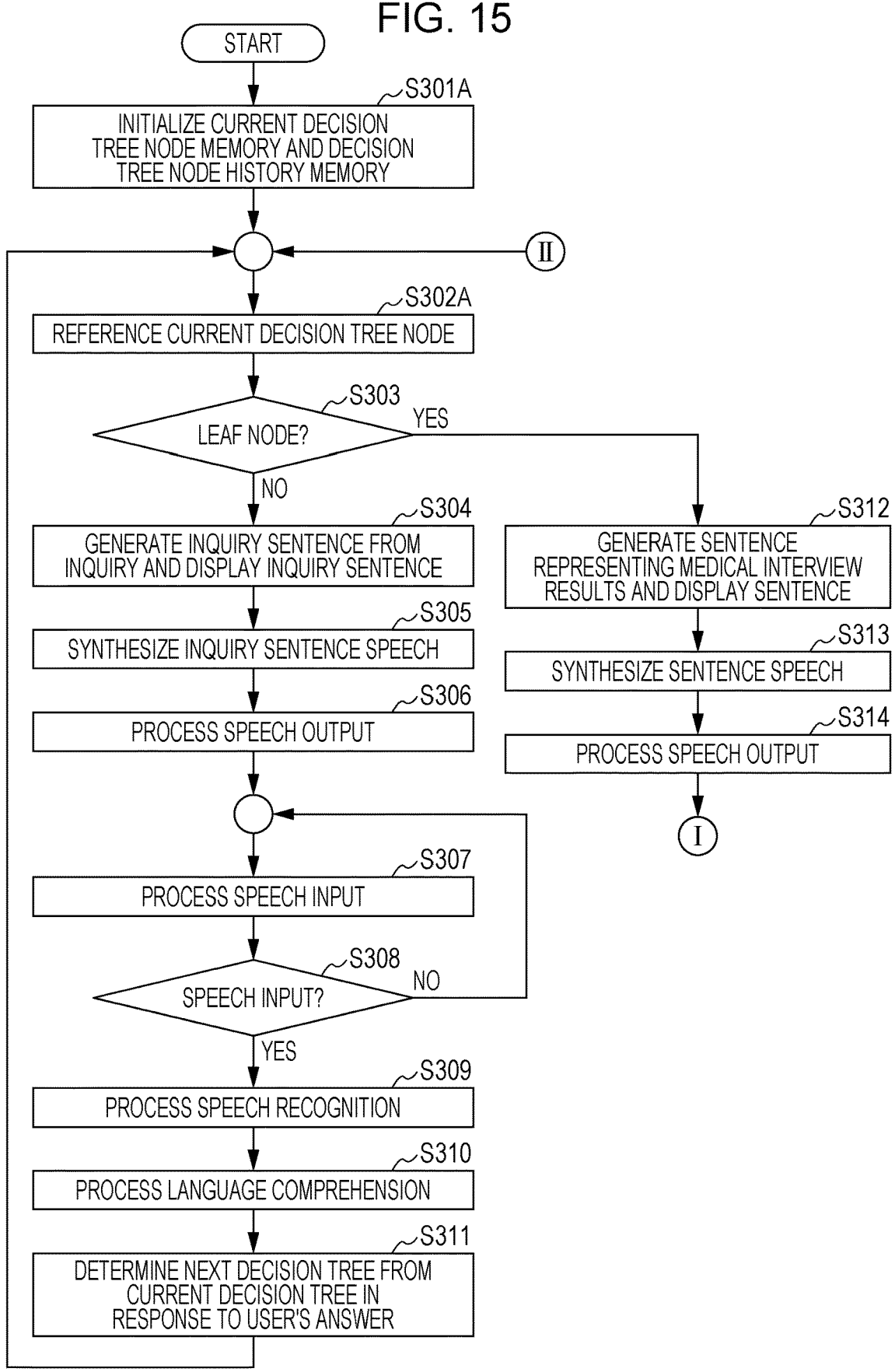
FIG. 15 is a flowchart illustrating a process of the medical interview system of FIG. 13.
Figure 16:
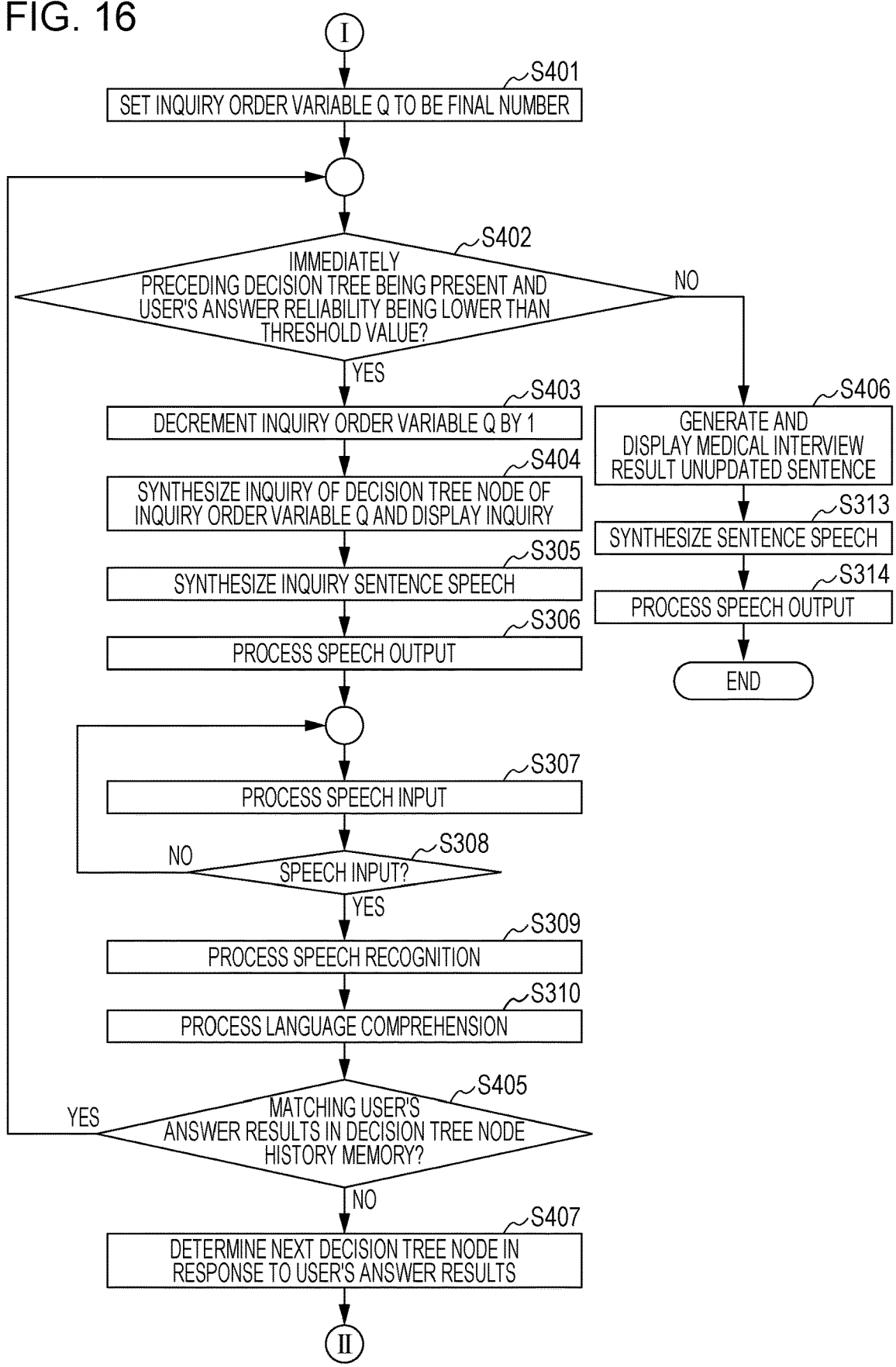
FIG. 16 is a continuation of the process of the medical interview system of FIG. 13.

FIG. 15 is a flowchart illustrating a process of the medical interview system of FIG. 13, and FIG. 16 is a continuation of the process of the medical interview system of FIG. 13.

The process of FIG. 15 and FIG. 16 is different from the process of FIG. 11 in that steps S301A and S302A are substituted for steps S301 and S302, and the process illustrated in FIG. 16 is added to the end of step S314. The rest of the process of FIG. 15 and FIG. 16 remains unchanged from the process of FIG. 11, and the detailed discussion thereof is omitted herein.

In step S301A, the medical interview controller 507A initializes the current decision tree node memory 506 as well as the decision tree node history memory 512. In step S302A, the medical interview controller 507A references the ID of the decision tree node of the current decision tree node memory 506 and adds information concerning the ID of the referenced decision tree node to the end of the history table of the decision tree node history memory 512.

The same process as the process of FIG. 11 is performed, and after the operation in step S314 is complete with the medical interview results determined, the process of FIG. 16 is performed starting with the operation in step S401 to perform a re-inquiry process. Since the operations in steps S305 through S310 and in steps S313 and S314 of FIG. 16 are identical to those in steps S305 through S310 and in steps S313 and S314 of FIG. 11, the detailed discussion thereof is omitted herein.

In the re-inquiry process of FIG. 16, the medical interview controller 507A initializes an inquiry order variable Q with an inquiry order number at the end of the decision tree node history memory 512 (step S401).

The medical interview controller 507A references the decision tree node history memory 512 and determines whether the history information of the decision tree node is at the location at the inquiry order immediately prior to the location indicated by the inquiry order variable Q and whether the reliability of the user's answer in the history information of that decision tree node is lower in value than the value of a specific reliability (a specific threshold value) (step S402).

If the above two conditions are not satisfied in step S402, repeating the medical interview is not needed. The medical interview controller 507A instructs the language generator 508 to generate a medical interview result unupdated sentence to notify the user that there is no updating in the medical interview results. The language generator 508 synthesizes the medical interview result unupdated sentence, and sends the medical interview result unupdated sentence to the speech synthesizer 509 and the display 511. The display 511 displays the text of the medical interview result unupdated sentence (step S406).

The operations in steps S313 and S314 are then performed in the same way as in FIG. 11. The speech synthesizer 509 synthesizes the medical interview result unupdated sentence (S313), and the speech outputter 510 outputs the speech signal synthesized by the speech synthesizer 509 (step S314) so that the user may hear the medical interview result unupdated sentence in voice. The process of FIG. 16 thus ends.

In step S402, if the two conditions are satisfied, the medical interview controller 507A decrements the inquiry order variable Q by 1 (step S403). The medical interview controller 507A sends to the language generator 508 an inquiry responsive to the attribute having the node ID of the history information of the decision tree node at the location of the inquiry order variable Q. The language generator 508 synthesizes an inquiry sentence asking about the attribute having the node ID of the history information of the decision tree node at the location of the inquiry order variable Q, and sends the inquiry sentence to the speech synthesizer 509 and the display 511. The display 511 displays the text of the inquiry sentence (step S404).

The operations in steps S305 through S310 are then performed in the same way as in the process of FIG. 11. The user's answer result processor 504A receives the operation results of step S310 (the language comprehension results of the user's speech), and determines whether the user's answer results in the history information of the decision tree node at the location of the inquiry order variable Q matches the language comprehension results of the received user's speech (step S405).

If it is determined in step S405 that the user's answer results on the decision tree node history memory 512 matches the language comprehension results, the answer is likely to be certain because no change has occurred in response to the same inquiry. Processing returns to step S402 to revert back to an immediately preceding inquiry.

If it is determined in step S405 that the user's answer results on the decision tree node history memory 512 fail to match the language comprehension results, the user has reversed his or her previous answer. To repeat the medical interview starting with the location of that inquiry, the medical interview controller 507A references the inquiry order memory 505, determines a node ID to go to next, and writes onto the current decision tree node memory 506 the determined node ID as an ID of a current the decision tree node (step S407). Processing then returns to step S302A of FIG. 15, and the medical interview is performed again.

Concerning the user's answer that has been obtained in response to the inquiry in the medical interview results and has reliability lower in value than the threshold value, the same inquiry may be made again. It is verified whether the user's first answer is likely to be correct. If the user's second answer to the same inquiry is different from the user's first answer, the medical interview is started over again from the time point at which the user's answer becomes inconsistent. The reliability of the medical interview is thus increased.

The decision tree generating apparatus of the embodiment of the disclosure is effective in applications to identify a highly probable factor that causes a phenomenon the user may perceive, through the user's answer to an inquiry about the phenomenon perceived by the user. For example, the decision tree generating apparatus may be applied to fault diagnosis of a device or fortune-telling, or personality analysis through the user's answer.

What is claimed is:

1. A decision tree generating apparatus comprising:
an information gain calculator that, when a classification target data set including a plurality of pieces of classification target data respectively having mutually different attributes with attribute values assigned thereto is hierarchically segmented into a plurality of subsets in a form of a decision tree,
calculates an amount of reduction in entropy of a pre-segmentation classification target data set caused by segmentation on each attribute of each piece of the classification target data included in the pre-segmentation data set, and
calculates an information gain when the pre-segmentation data set is segmented in accordance with the attribute value of each attribute, based on the amount of reduction in the entropy and reliability of a user's answer, the reliability being an index representing correctness or incorrectness of the user's answer responsive to an inquiry asking about the attribute;
a decision tree generating circuit that
successively determines an attribute having a maximum information gain to be a node of the decision tree by recursively iterating the segmentation of the pre-segmentation data set in accordance with an attribute value of the attribute having the maximum information gain from among the information gains calculated on the attributes,
determines an order of inquiries to be asked about the attributes in order to classify the pieces of classification target data by successively assigning the attribute value of the attribute having the maximum information gain to an edge of the node, and
generates a decision tree having the determined order of inquiries, wherein the order of inquiries to be asked is determined based at least on the reliability of the user's answer; and
a speech synthesizer circuit that synthesizes at least one of the inquiries to be asked into a speech signal; and
a speech outputter circuit that outputs the synthesized speech signal to the user.

2. The decision tree generating apparatus according to claim 1, further comprising a reliability calculator that calculates the reliability on each attribute from user's answer instance data that includes instances of a user's correct answer and a user's incorrect answer in response to an inquiry asking about the each attribute,
wherein the information gain calculator calculates the information gain obtained when the pre-segmentation data set is segmented on a per attribute basis in accordance with the attribute value of each attribute, based on the reliability calculated by the reliability calculator and the amount of reduction in the entropy.

3. The decision tree generating apparatus according to claim 1, wherein the reliability comprises a correct answer rate of the user's answer responsive to the inquiry asking about the attribute, and
wherein the information gain calculator calculates the information gain by multiplying the amount of reduction in the entropy by the correct answer rate.

4. The decision tree generating apparatus according to claim 3, wherein the user's answer instance data includes data concerning an answer time period until the user gives an answer in response to an inquiry,
wherein the correct answer rate includes a correct answer rate of an average answer time period of the user determined from a correlation between the answer time period and the correct answer rate, and
the information gain calculator calculates the information gain by multiplying the amount of reduction in the entropy by the correct answer rate of the average answer time period.

5. The decision tree generating apparatus according to claim 1, wherein the reliability includes conditional entropy when a specific attribute value that is an answer to an inquiry asking about a specific attribute is acquired, and
wherein the information gain calculator calculates the information gain by subtracting the conditional entropy from the amount of reduction in the entropy.

6. The decision tree generating apparatus according to claim 2, wherein the user's answer instance data further includes user information representing an attribute of the user,
wherein the reliability calculator calculates the reliability on the attribute of each user from the user's answer instance data, and
wherein the information gain calculator calculates the information gain on the attribute of each user, based on the reliability and the amount of reduction in the entropy.

7. The decision tree generating apparatus according to claim 1, wherein the decision tree generating circuit generates a single decision tree from the plurality pieces of classification target data.

8. The decision tree generating apparatus according to claim 1, wherein the decision tree generating circuit
sets the classification target data set to be an initial value of the pre-segmentation data set,
causes the information gain calculator to calculate the information gain when the pre-segmentation data set that is set in accordance with the attribute value of each attribute is segmented into the subsets,
determines the attribute having the maximum information gain to be a node that segments the set pre-segmentation data set,
segments the pre-segmentation data set into the subsets in accordance with the attribute value of the attribute having the maximum information gain,
marks the attribute having the maximum information gain on each of the subsets,
newly sets each of the subsets to be the pre-segmentation data set,
recursively iterates the calculating, the determining, the segmenting, and the marking on the newly set pre-segmentation data, and
causes the information gain calculator to calculate the information gain when the set pre-segmentation data set is segmented in accordance with the attribute value of an attribute, which has not been marked, from among the attributes.

9. An inquiry system that generates classification results from a user's answer to an inquiry, the inquiry system comprising:
a memory that stores a decision tree that is generated by the decision tree generating apparatus according to claim 1;
an inquiring circuit that outputs an inquiry in accordance with the decision tree stored on the memory;
an acquiring circuit that acquires the user's answer responsive to the inquiry from the inquiring circuit; and
a generating circuit that generates the classification results responsive to the user's answer acquired by the acquiring circuit.

10. The inquiry system according to claim 9, further comprising a history memory that stores inquiry order information representing an order of inquiries by the inquiring circuit, attribute identification information that identifies an attribute corresponding to an inquiry by the inquiring circuit, an attribute value that is an answer to the inquiry by the inquiring circuit, and reliability on the attribute corresponding to the inquiry by the inquiring circuit,
wherein the generating circuit, after generating the classification results, makes an inquiry again asking about an attribute having reliability lower in correctness than a specific value by referencing the history memory.

11. A decision tree generating method of a decision tree generating apparatus, the decision tree generating method comprising:
when a classification target data set including a plurality of pieces of classification target data respectively having mutually different attributes with attribute values assigned thereto is hierarchically segmented into a plurality of subsets in a form of a decision tree,
calculating an amount of reduction in entropy of a pre-segmentation classification target data set caused by segmentation on each attribute of each piece of the classification target data included in the pre-segmentation data set, and
calculating an information gain when the pre-segmentation data set is segmented in accordance with the attribute value of each attribute, based on the amount of reduction in the entropy and reliability of a user's answer, the reliability being an index representing correctness or incorrectness of the user's answer responsive to an inquiry asking about the attribute;
successively determining an attribute having a maximum information gain to be a node of the decision tree by recursively iterating the segmentation of the pre-segmentation data set in accordance with an attribute value of the attribute having the maximum information gain from among the information gains calculated on the attribute;
determining an order of inquiries to be asked about the attributes in order to classify the pieces of classification target data by successively assigning the attribute value of the attribute having the maximum information gain to an edge of the node
generating a decision tree having the determined order of inquiries, wherein the order of inquiries to be asked is determined based at least on the reliability of the user's answer;
synthesizing, by a speech synthesizer circuit, at least one of the inquiries to be asked into a speech signal; and
outputting, by a speech outputter circuit, the synthesized speech signal to the user.

12. A non-transitory computer-readable recording medium storing a program causing a computer to execute a process for generating a decision tree, the process comprising:
when a classification target data set including a plurality of pieces of classification target data respectively having mutually different attributes with attribute values assigned thereto is hierarchically segmented into a plurality of subsets in a form of a decision tree,
calculating an amount of reduction in entropy of a pre-segmentation classification target data set caused by segmentation on each attribute of each piece of the classification target data included in the pre-segmentation data set, and
calculating an information gain when the pre-segmentation data set is segmented in accordance with the attribute value of each attribute, based on the amount of reduction in the entropy and reliability of a user's answer, the reliability being an index representing correctness or incorrectness of the user's answer responsive to an inquiry asking about the attribute;

successively determining an attribute having a maximum information gain to be a node of the decision tree by recursively iterating the segmentation of the pre-segmentation data set in accordance with an attribute value of the attribute having the maximum information gain from among the information gains calculated on the attributes;

determining an order of inquiries to be asked about the attributes in order to classify the pieces of classification target data by successively assigning the attribute value of the attribute having the maximum information gain to an edge of the node;

generating a decision tree having the determined order of inquiries, wherein the order of inquiries to be asked is determined based at least on the reliability of the user's answer;

synthesizing, by a speech synthesizer circuit, at least one of the inquiries to be asked into a speech signal; and outputting, by a speech outputter circuit, the synthesized speech signal to the user.

* * * * *